US010028357B2

(12) United States Patent
Scordato et al.

(10) Patent No.: US 10,028,357 B2
(45) Date of Patent: Jul. 17, 2018

(54) LED LIGHT BULB, LAMP FIXTURE WITH SELF-NETWORKING INTERCOM, SYSTEM AND METHOD THEREFORE

(71) Applicants: Stephen Scordato, Lockport, NY (US); John A. Carlin, Buffalo, NY (US); Kevin A. Grupp, Clarence, NY (US); Michael Arno, Clarence, NY (US)

(72) Inventors: Stephen Scordato, Lockport, NY (US); John A. Carlin, Buffalo, NY (US); Kevin A. Grupp, Clarence, NY (US); Michael Arno, Clarence, NY (US)

( * ) Notice: Subject to any disclaimer, the term of this patent is extended or adjusted under 35 U.S.C. 154(b) by 0 days.

(21) Appl. No.: 15/589,502

(22) Filed: May 8, 2017

(65) Prior Publication Data

US 2018/0020530 A1  Jan. 18, 2018

Related U.S. Application Data

(60) Provisional application No. 62/361,775, filed on Jul. 13, 2016, provisional application No. 62/361,803, (Continued)

(51) Int. Cl.
*H04M 1/60* (2006.01)
*H04M 9/00* (2006.01)
(Continued)

(52) U.S. Cl.
CPC ......... *H05B 37/0236* (2013.01); *F21K 9/232* (2016.08); *F21K 9/235* (2016.08); *F21K 9/237* (2016.08); *F21K 9/238* (2016.08); *F21S 9/02* (2013.01); *F21V 3/02* (2013.01); *F21V 29/70* (2015.01); *F21V 29/89* (2015.01); *G10L 15/22* (2013.01); *H04M 9/001* (2013.01); (Continued)

(58) Field of Classification Search
USPC .................................................. 379/167.01
See application file for complete search history.

(56) References Cited

U.S. PATENT DOCUMENTS 6,548,967 B1  4/2003  Dowling et al.
7,309,965 B2  12/2007  Dowling et al.
(Continued)

*Primary Examiner* — Quoc D Tran
(74) *Attorney, Agent, or Firm* — Vincent G. LoTempio; Kloss, Stenger & LoTempio; David T. Stephenson

(57) ABSTRACT

A networked light for illumination and intercom for communications in a single housing, with voice command and control, hands-free. The system in a housing configured to conventional looking lamp, bulb, fixture, lighting devices, suitable for a direct replacement of conventional illuminating devices typical found in homes or buildings. A network of such voice command and control systems may be further monitored and controlled from a base station that facilitates programming, communications, and higher functionality therebetween. The system provides speech recognition for powering on and off, dimming, brightening, and adjusting the lighting to preset, night and emergency settings. The voice recognition command controls the intercom to be active and attentive to requests, connecting two or more locations within a home or building structure, for speech exchanges in communications, via radio frequency transmitting and receiving of signal messages between the individual light and intercom system devices within a network of devices.

20 Claims, 19 Drawing Sheets

Related U.S. Application Data filed on Jul. 13, 2016, provisional application No. 62/397,598, filed on Sep. 21, 2016.

(51) Int. Cl.

| | |
|---|---|
| *H05B 37/02* | (2006.01) |
| *F21S 9/02* | (2006.01) |
| *F21K 9/232* | (2016.01) |
| *F21K 9/237* | (2016.01) |
| *H05B 33/08* | (2006.01) |
| *F21V 3/02* | (2006.01) |
| *F21K 9/238* | (2016.01) |
| *F21K 9/235* | (2016.01) |
| *F21V 29/70* | (2015.01) |
| *F21V 29/89* | (2015.01) |
| *H04R 1/02* | (2006.01) |
| *G10L 15/22* | (2006.01) |
| *H04R 27/00* | (2006.01) |

(52) U.S. Cl.
CPC ............ *H04R 1/028* (2013.01); *H04R 27/00* (2013.01); *H05B 33/0854* (2013.01); *H05B 37/0272* (2013.01); *G10L 2015/223* (2013.01); *H04R 2227/005* (2013.01); *H04R 2420/07* (2013.01)

(56) References Cited

U.S. PATENT DOCUMENTS

| | | | | |
|---|---|---|---|---|
| 9,654,678 | B1* | 5/2017 | Fu | H04N 5/2256 |
| 2010/0271802 | A1* | 10/2010 | Recker | H05B 33/0803 |
| | | | | 362/20 |
| 2010/0327766 | A1 | 12/2010 | Recker | |
| 2015/0312394 | A1* | 10/2015 | Mirza | H04M 1/7253 |
| | | | | 455/420 |
| 2016/0241947 | A1* | 8/2016 | Degraye | H04R 3/12 |

* cited by examiner

LED LIGHT BULB, LAMP FIXTURE WITH SELF-NETWORKING INTERCOM, SYSTEM AND METHOD THEREFORE

CROSS REFERENCE OF RELATED APPLICATIONS

This application claims the benefits of U.S. provisional application No. 62/361,775, filed Jul. 13, 2016 and entitled IMPROVED LED LIGHT BULB WITH ALARMING APPARATUS FOR SMOKE, CARBON MONOXIDE & GAS AND METHOD THEREFORE, which provisional application is incorporated by reference herein in its entirety; and further this application claims the benefits of U.S. provisional application No. 62/361,803, filed Jul. 13, 2016 and entitled IMPROVED LED LIGHT BULB WITH ALARMING APPARATUS FOR SMOKE, CARBON MONOXIDE & GAS SYSTEM AND METHOD THEREFORE, which provisional application is incorporated by reference herein in its entirety; and further, this application claims the benefits of U.S. provisional application No. 62/397,598, filed Sep. 21, 2016 and entitled IMPROVED LED LIGHT BULB WITH VOICE COMMAND CONTROL, HAVING ALARMING APPARATUS FOR SMOKE, CARBON MONOXIDE & GAS, SYSTEM AND METHOD THEREFORE, which provisional application is incorporated by reference herein in its entirety.

FIELD OF THE INVENTION

The present invention relates generally to illuminating light bulbs and lamp fixtures that further function as an intercom device, and more particular to the networking of such devices comprising a home communication system. One embodiment, also includes an additional embodiment in that the self-networking illuminating light bulbs and lamp fixtures also provide an intercom device for communicating in a home, building or commercial structure. The intercom device can provide a talkback, door phone, or other stand-alone voice communications system for use within a building or small collection of buildings, functioning independently of the public telephone network.

In another embodiment, the system and method has voice command control of both lighting controls and intercom communications within said structures. More so, the present invention device, while enabled by voice commands to regulate operation of illumination, the voice commands make direct communication connections between point-to-point living spaces within networked areas in a hands-free configuration.

In another embodiment, the network may include a base station or central controller and controllable with a plurality of predetermined voice commands; whereby the systems are systematically disposed through different sections of a structure; whereby each system independently comprises a microphone for listening for commands and, a speaker for announcing, and, for communicating with adjacent systems.

The present patent utilizes a radio frequency (RF) with coded signals to communicate, and establish an audio link between one or more points in a network; whereby a means to record a short message and a means to retrieve such recorded message. The network further can assist in hands-free telephone line connections via an apparatus especially adapted to said telephone line and responsive to dial commands; making communications to parties outside network through the phone line (or Wi-Fi, Cellular, LAN, Computer, etc).

Also, the system may include a unique speech voice recognition controller that is operational in a lighting lamp fixture. In one embodiment, multiple lighting lamp fixtures network with one another, also network with a base-station control-center. The voice recognition controller helps tie together all the systems and the base-station control-center together; whereby the lighting lamp fixture snaps together to actuate a rechargeable battery active and prepare the system for service. The base-station control-center receives and transmits real-time radio frequency (RF) communications both to control all systems, system wide and display activity as to location and messaging; whereby the communications means having a unique coded ID representing every aspect of every individual system in the network; whereby an embodiment that utilizes the microphone for voice control commands via speech recognition; whereby the voice speech recognition controller comprises of three parts: an awareness/trigger part, a correlative part, and a directive part; said parts comprising a lighting command such as 'light-table-dim' that can be spoken in any order for light control, and, 'intercom-active' for intercommunications between living areas within a structure.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known in the art that an intercom comprises a door or gate intercom apparatus and a residential master station. Typically, an intercom apparatus is mounted on a position proximate the entrance (e.g., door) of a building and comprises a camera and a telephone set both electrically connected to an external power source such that power can be fed from the power source to the components of the door intercom apparatus. An electrical wiring is interconnected the door intercom apparatus and the residential master station inside the house of the building.

In many instances, a residential master station comprises a picture monitor and a microphone and speaker unit. In response to a visitor pressing a call button of the door intercom apparatus, the visitor can talk with a resident by means of the telephone set. Also, the resident can see the visitor from the screen of the picture monitor and talk with the visitor by means of the microphone and speaker unit. The resident then may press a push button of the residential master station to enable an electric lock on the door to open for allowing the visitor to come in after confirming the identification of the visitor.

It is also known in the art that in the field of Light Emitting Diode (LED) light bulbs, there exists a need to expand their usefulness. LED light bulbs are manufactured in most any style lamp to match older incandescent bulbs, and even newer halogen, florescent, etc. type bulbs, to give illumination. These devices are useful and use just a fraction of energy to operate them over prior art lighting technologies. Most LED lamps are produced using 120 VAC Line power (220/230 VAC depending where in the world they are marketed) as the supply voltage, to provide and easy and convenient direct replacement, and are found more and more homes, offices and industry.

Similarly, there are intercom devices and systems, manufactured for homes, etc., provide a communications link between areas within said homes; these systems consist of both hard-wired and radio frequency (RF) linked devices. One would either run wires between various points within a structure and have mounted in locations on a wall, or, place conventional (radio-linked) devices, such a phone looking apparatus, on various pieces of furniture around the structure. To communicate, one would go to a location within the room, etc., press a button and make an announcement that was transmitted to other units in the system in other rooms.

While it is obvious that the above conventional LED lighting bulbs and conventional intercom devices offer tremendous acceptance around the world as useful devices, there is no prior art that combines the two fields; lighting and communications to comprise a unique operating system. Further, there is no convenient monitoring base station or central control for typical homes and buildings. And finally, the conventional LED light bulb must be controlled ON/OFF or DIM via wall switches most commonly, and more unusual, via a 'smart phone' application, designed to control lighting.

Having a light bulb that is responsive to voice commands and incorporates an intercom, all hands-free, would greatly reduce or eliminate the problems with independent devices. Such an improved new device would be configured to replace any conventional light bulb in table lamps, floor lamp, recessed ceiling fixtures, furniture lamps, track lighting, plug-in nightlights, etc., and include a rechargeable battery. It would operate as usual with respect to lighting, but, be responsive to voice commands such as; ON, OFF, DIM, BRIGHT, PRESET, NIGHT and EMERGENCY; when AC Line power is provided, the light will illuminate. Further the AC Line power will keep the rechargeable battery at full charge. When the AC Line is OFF (not available), the battery will keep alive necessary circuitry for emergency lighting and the intercom communications.

An improved system would also include a 'programing' of the vocabulary, comprising the speech voice recognition library that can be a learning process means. For example, someone who has a speech impediment, accent or any kind of non-normal speech that would make the voice command difficult to ascertain by the device, said speech unique to the systems owner can be achieved by venture of said learning process. That is, the owner would 'pronounce each voice command', and such, be record to memory of its particular 'learned' articulation. All network devices would share the learned vocabulary. The result is that each network system now can fully understand so-called standard 'canned' voice command (that was part of the manufacturing process), and, the learned unique speech inflection of the same commands (representation of the commands); generated from the owner of the system.

In the case of a low battery situation, for example in a room that is rarely used like a guest bedroom and the device VAC Line power was not available (as in the case if the wall-switch was in the OFF position; normally the wall switch would be left in the ON position and commanded to OFF, when desired), the device would 'chirp' if the battery gets too low. In such a case, to charge the battery, the user of the present invention would simple turn the lamp or fixture to ON (providing VAC Line power) for a short period of time. This would sufficiently re-charge the battery and chirping would immediately stop.

Voice activated command control of the lighting function affords great convenience to the user. By simply leaving the wall-switch or lamp on/off switch, in the ON position at all times (or eliminating it altogether), the lighting and intercom can be controlled via voice commands to a whole selection of helpful functions. The unit can be preset to modes such as AUTO; offering illumination by one simply walking into an area, and having it turn off again when leaving. Or, TIMER; turning the fixture on and off at arbitrary times at pre-set levels of intensity (within a predetermined time range) making it look like occupants are home. Further the lamp accepts several other commands to temporally changing settings simply by requesting such change verbally. Such commands as to DIM, or to BRIGHT, to turn OFF or turn ON; until the next 'mode' schedule or event occurs. When coupled with the base-station/control-center, the convenience is further achieved by controlling the whole house using voice commands.

Such convenience as going to bed with all the usual lights on, and then from the convenience of the master bedroom, commanding the base-station control-center verbally, to enter NIGHT-MODE or EMERGENCY lighting (especially in a battery mode of operation of just 20% illumination capacity to save battery energy). Such commands could turn off any living illumination throughout the home network while turning on any desired 'security' type lighting as was predetermined when setting-up the mode via the optional base-station control-center. Such lighting functions are too impractical by an application on a smart phone alone (smart phone batteries frequently go dead or the phone goes missing, misplaced, etc.), but, by a dedicated control-center designed specifically to manage lighting and intercom communications. The present invention utilizes a smart phone application, but it is in conjunction with the base-station control-center that is always present and giving status.

An example of the intercom communications, would be to first get the system's attention; the system is always listing for an activation word. INTERCOM ACTIVE, for example, would result with the system responding in a tone burst (through the speaker) of 'BING' indicating a broadcast mode is being initiated by a first user. Followed by an opportunity of a system wide broadcasting of the user's verbalizations. If there is no verbalization heard within five seconds, the system would automatically exit the broadcast mode with a 'BONG', i.e., no longer listening.

The two-tone bursts (BING & BONG) are distinct tonal sounds that clearly indicate being active, for the case of BING, and, inactive for the case of BONG. That is, BING ending with a 'high' tone note, and, BONG ending with a 'low' tonal note. Obviously, any such tones would suffice but for clarity of this presentation BING & BONG will be used to indicate actively engaged and disengage respectively. Once a second user's responds to the initiated verbalization is heard by the intercom system, a two-way communication is established between the first and second units only. That is, all other units in the system that are not part of the conversation established by the first and second users. The intercom feature of the system has other routines and features as well.

The present patent provides convenient and easy installation of an intercom system, throughout a structure by simply replacing a lighting lamp/bulb in each desired room; to affect a more efficient means to both illuminate the rooms and have hand-free communications; all in one direct replaceable package, configured to any conventional light bulb 'style' or of any technology (incandescent, halogen, fluorescent, etc.). A home or building could have as many of these improved light/intercom lamps as there are fixtures, creating a system network of communication signaling devices via short-range radio frequency transceivers; greatly improving the convenience and security of the home and the lives of the occupants.

And with great importance, a base-station control-center, meant to be located in the master bedroom and other centrally located arias such a kitchen or family room or the cross-roads of activity, would read these transmitted signals via coded ID identification and display their exact status and locations. Importantly the base-station control-center, combined with a network of LED lamp lighting/intercom devices, all affording the convenience of verbal voice commands to control and display, both light living environment, and intercom communication, anywhere in the structure.

Prior to the filing of this application, the subject inventors conducted a patentability investigation in the field light bulbs, LED lighting, and intercom related systems. The following patents were uncovered in the search.

| Inventor | Reg. No. | Date |
|---|---|---|
| McMillen | US 2008/0198583 A1 | Aug. 21, 2008 |
| Bradley, et al. | US 2009/0237260 A1 | Sep. 24, 2009 |
| Chan | US 2014/0042909 A1 | Feb. 13, 2014 |
| Filipovic, et al. | US2015/0259078 A1 | Sep. 17, 2015 |
| Filipovic, et al. | US2016/0270148 A1 | Sep. 15, 2016 |
| Typrin, et al. | U.S. Pat. No. 9,641,954 | May 2, 2017 |

McMillen—U.S. patent application, 2008/0198583 A1 is a multi-purpose lamp cylindrical lamp housing for ceiling instillations, having a plurality of components including a loudspeaker, detectors, heat, sound, noxious gas, alarms, video cam and intercom. The intercom for production music; the video camera for capture video of those walking below; the loudspeaker can produce music, voice, alarm sounds; the detectors for detecting and a lamp for illumination.

Bradley, et al.—U.S. patent application, 2009/0237260 A1 having a base containing a threaded female socket similar to a standard light bulb, and, a corresponding male threaded connector. The system thus is able to be electrically connected to, as well as physically mounted to, by simply screwing the male threaded connector into the female threaded socket; making the device serviced as easily as changing a light bulb.

Chan—U.S. patent application, US 2014/0042909 A1 is an energy-saving LED illumination device having a drive control unit placed on a detachable and replaceable voice control module, and electrically connected to a voice sensing unit to receive the signal and emit a driving signal, thereby turning on or turning off the light source.

Filipovic, et al.—U.S. patent application, 2015/0259078 A1 is a Handy Base Station connecting a lamp socket with LED's for lighting, and, a wireless communication means combined to communicate with unmanned aerial vehicles (UAV); such lighting and communicating with UAV's located on a pole, such as a utility pole, for recharging the UAV's batteries and guiding the UAV in flight.

Filipovic, et al.—U.S. patent application, 2015/0270148 A1 is a furtherance Handy Base Station connecting a lamp socket with LED's for lighting, and, a wireless communication means combined to communicate with unmanned aerial vehicles (UAV); such lighting and communicating with UAV's located on a pole, such as a utility pole, for recharging the UAV's batteries and guiding the UAV in flight.

Typrin, et al.—U.S. Pat. No., 9,641,954 is a device that includes a microphone and a speaker and that may capture audio uttered by a user. The device, or another device, may then perform a particular operation in response to the captured audio. A user's cell phone number may be associated with the device. When an incoming call is directed to the user's cell phone, the device may generate a notification. The user may utter a command that causes the device to establish an audio connection with a cellular carrier network, thereby facilitating the phone conversation while bypassing the cell phone. Similarly, a user may make an outgoing call associated with the user's cell phone. The outgoing call is facilitated through an audio connection between the device and the cellular carrier network, bypassing the cell phone.

None of the above approaches in the prior art discloses a means for integrating a LED lighting means with intercom communication means within a single bulb 'housing' envelope. Also, none of the listed prior art can or will directly replace a conventional sized or shaped light bulb, configured to any style or type; having wireless system networking, with voice recognition commands and controls; suitable for any light/lamp fixture sitting on the floor, on a table, mounting on a wall, or in or on a ceiling.

They all present housings of some structure that 'fit' between a lighting fixture and a conventional light bulb, or, inserted into a ceiling. And as such, thus making it impossible to be installed practicably into common lighting possibilities in general homes or buildings. While some of the prior art does have LED's for lighting in some cases, they do not signal with one-another in a network to create communication between units; to record messages; to play-back messages and to connect to out-of-network (OON) communications such as line-line and/or cellular phones, WiFi or LAN, accessible via a secure personal identification ID code (PIN).

The optional base-station control center, ties all system units (lamp/intercom apparatuses) together, affording immediate and timely updated status of the whole network. And lastly, with respect to the LED light bulb illumination voice command features, the present invention provides convenient 'VOICE COMMAND' control of lighting in several modes (AUTO, TIMER, NIGHT, EMERGENCY, TEST, etc.) of operation including temporary changes simply by verbally commanding a desired light effect; such as DIM, BRIGHT, ON, OFF, PRESET, etc. While the intercom voice command features include; INTERCOM ACTIVE, INTERCOM RECORD, INTERCOM PLAY-MESSAGE, etc.

SUMMARY

Illustrative embodiments of the disclosure are generally directed to a networked lighting system that also functions as a communication device with each other and with a base station that is operable with electronic coding for each network device.

Self-networking illuminating light bulbs and lamp fixtures also provide an intercom device for communicating in a home, building or commercial structure. The intercom device can provide a talkback, door phone, or other stand-alone voice communications system for use within a building or small collection of buildings, functioning independently of the public telephone network.

In another embodiment, the system and method has voice command control of both lighting controls and intercom communications within said structures. More so, the present invention device, while enabled by voice commands to regulate operation of illumination, the voice commands make direct communication connections between point-to-point living spaces within networked areas in a hands-free configuration.

In another embodiment, the network may include a base station or central controller and controllable with a plurality of predetermined voice commands; whereby the systems are systematically disposed through different sections of a structure; whereby each system independently comprises a microphone for listening for commands and, a speaker for announcing, and, for communicating with adjacent systems.

The present patent utilizes a radio frequency (RF) with coded signals to communicate, and establish an audio link between one or more points in a network; whereby a means to record a short message and a means to retrieve such recorded message. The network further can assist in hands-free telephone line connections via an apparatus especially adapted to said telephone line and responsive to dial commands; making communications to parties outside network through the phone line (or Wi-Fi, Cellular, LAN, Computer, etc).

Also, the system may include a unique speech voice recognition controller that is operational in a lighting lamp fixture. In one embodiment, multiple lighting lamp fixtures network with one another, also network with a base-station control-center. The voice recognition controller helps tie together all the systems and the base-station control-center together; whereby the lighting lamp fixture snaps together to actuate a rechargeable battery active and prepare the system for service. The base-station control-center receives and transmits real-time radio frequency (RF) communications both to control all systems, system wide and display activity as to location and messaging; whereby the communications means having a unique coded ID representing every aspect of every individual system in the network; whereby an embodiment that utilizes the microphone for voice control commands via speech recognition; whereby the voice speech recognition controller comprises of three parts: an awareness/trigger part, a correlative part, and a directive part; said parts comprising a lighting command such as 'light-table-dim' that can be spoken in any order for light control, and, 'intercom-active' for intercommunications between living areas within a structure.

Significantly, the light/intercom system also utilizes a unique voice recognition to control illumination and communications, and that is operable through a speech voice recognition controller. The speech recognition controller is operationally integrated in a lighting lamp fixture, allowing a user to control various aspects of lighting and intercom communications of the system through a plurality of predetermined voice commands and at least one voice pattern.

In one embodiment, the light/intercom system serves to provide multiple light fixtures that attach in standard areas of rooms in a building, i.e., master bedroom, living room, kitchen, garage, basement, etc. The light/intercom system is systematically disposed through different rooms of a house. Each light/intercom system independently function to illuminate such areas, and, provide an 'audible link' to all other areas.

In some embodiments, multiple systems form a network in a house, office or commercial entity. In one embodiment, multiple light/intercom systems are monitored and controlled from a base-station control-center that facilitates communication between multiple light/intercom systems in the network. The base-station control-center is operable to program, monitor and display all activity in the building network area, such as a home. The base station provides control and information to the user that is unavailable by any other means. The base station is programmed with a unique coding system to establish identification of the device manufacturing iteration, a house code, a unit number and location designator, repeat message (for re-transmitting), and a light/intercom category coding ID. Thus, each light/intercom system has its own, unique code protocol. A special 'black-box', within the base-station (or third party device) having the same unique house code identifier, also enables the light/intercom system, connectivity with a cellular line, a land-line, a WiFi and a computer; making the light/intercom system functional both in-network and out-of-network.

The base-station control-center may be located in the master bedroom and other centrally located areas such a kitchen or family room; where there are the crossroads of activity, would read these transmitted signals of lighting commands and intercom activity, and, display their status and locations. Additionally, the base station means can read other light/lamp/detector devices that are part of the inventor's product line of home safety/security/convenience systems in other inventions. These other devices share the same unique electronic coding ID communications protocol.

In some embodiments, the light/intercom system integrates a unique speech recognition function to regulate the visual illumination. The voice activated means of the light/intercom system is operationally integrated inside a two-piece housing that contains all the components necessary for home communications, lighting, convenience, networking control system. In this manner, a voice commands can be picked up from any location in any room in the house.

In one embodiment of voice recognition functionality, the light/intercom system comprises a speech voice recognition controller. The speech recognition controller is operational in a lighting lamp fixture. In one embodiment, multiple lighting lamp fixtures network together. In another embodiment, the networked lighting lamp fixtures also network with the optional base-station control-center. The voice recognition controller helps tie together all the systems and the base-station control-center together.

In construction, the lighting lamp fixture resembles a standard light bulb known in the art, while also housing the components of the light/intercom system. The lighting lamp fixture is modular and snaps together to actuate a rechargeable battery, preparing the light/intercom system for service. The base-station control-center receives and transmits real-time radio frequency (RF) communications both to control all systems system wide and display light/intercom events as to location. These communications include a unique coded ID representing every aspect of every individual system in the network.

In one embodiment, the speech voice recognition controller comprises a microphone for voice control commands via speech recognition.

In some embodiments, the speech voice recognition controller comprises multiple stage parts: a trigger portion, a correlative portion (objective), and a directive portion (instruction). These portions include a lighting command that commands a light to turn on, dim, and turn off. The lighting command may include, without limitation, 'light-table-dim' that can be spoken in any order, for example; table-light-dim, dim-table-light, etc. The light/intercom system further has voice commands specific to the intercom.

For the intercom aspects, in one embodiment, the trigger portion is a 'INTERCOM-ACTIVE' prompt.

In one embodiment, the trigger portion is a 'INTERCOM-RECORD' prompt.

In one embodiment, the trigger portion is a 'INTERCOM-PLAY' prompt.

In one embodiment, the trigger portion is a 'INTERCOM-PHONE' prompt.

In one embodiment, the trigger portion is a 'INTERCOM-ANSWER' prompt.

In one embodiment, the trigger portion is a 'INTERCOM-CANCEL' prompt.

For the lighting aspects, in one embodiment, the trigger portion is a 'LIGHT' prompt.

In another embodiment, a CEILING command actuates a light, lamp, or fixture on the ceiling such as a recessed, track, projector, flood, etc.

In another embodiment, a FLOOR command actuates a light, lamp, or fixture with the base on the floor such as a floor standing lamp, etc.

In another embodiment, a TABLE command actuates a light, lamp or fixture on a table.

In another embodiment, a WALL command actuates a light, lamp or fixture on a wall, or light shining a wall, such as from wall projection lighting, art lighting, wall sconces, nightlight, etc.

In another embodiment, the directive portion is an instruction that is used to command a function ON, OFF, DIM, BRIGHT, NIGHT, PRESET, and EMERGENCY.

In another embodiment, the system comprises a plurality of modes of operation responding to voice commands. The voice commands being: AUTO, TIMER, RESET (NONE or NULL), TEST, and the modes being a manner of operation.

In another embodiment, a CHANGE-AUTO command is operable to enable the system to behave by turning lighting ON and OFF when a motion is sensed and present in the immediate area range of the system.

In another embodiment, a CHANGE-TIMER command actuates the system to power on and off lighting in a timed interval. The time interval automatically scales to increase and decrease length of interval giving an appearance that someone is physically causing the lights to turn on and off in a daily routine.

In another embodiment, a CHANGE-RESET command allows the system to return to a 'no-mode' or 'none'/'null' state, e.g., neither AUTO or TIMED or TEST mode of operation.

In another embodiment, a CHANGE-TEST command actuates the light/intercom system to 'step-through' and each assigned location with both sounding a tone visually strobing the various LED lights so the owner can effectively setup his individual home system; unique to his desired end use. The TEST command also allows an individual unit volume to be set during the process.

In another embodiment, the system provides a plurality of functional voice commands, including: ON, OFF, DIM, BRIGHT, PRESET, NIGHT, and EMERGENCY. These functions are an action of a task.

In another embodiment, an improved light/intercom system is operational to control lighting. This makes a conventional 'on/off switch' virtually obsolete. Thus, the light/intercom system is voice controlled via speech recognition commands. In one embodiment, the on/off switching of a light, lamp or fixture can be present but left in the 'ON' position (as is the case of replacing prior art lighting). Or, the switch can be removed completely (as in the case of a new building construction in future design).

In another embodiment, the voice commands of 'DIM' actuates the light to dim at increments of 20% illumination, and a command of 'BRIGHT' actuates the light to increase increments of 10%.

For example, a voice command of 'ON' to illuminate the system 100%. The voice command of 'OFF' the light, returning the system to 0% of full illumination.

The system also provides a voice command of 'DIM' to decrease the light by 20% for each dim command.

The system also provides a voice command of 'BRIGHT' would increase the system by 10% for each command, The system also provides a voice command of 'NIGHT' to change the level of illumination from the range of 0% to 100%, as desired for night security.

The system also provides a voice command of 'PRESET' to change the level of illumination from the range of 0% to 100%, as desired for living environment lighting, The system also provides a voice command of 'EMERGENCY' to actuate one of two emergency lighting states. One emergency lighting state occurs when 120/230 VAC line power is available (power outage), whereby the light flashes full ON and OFF to give a 'panic' alert state when activated via the emergency feature. The other emergency lighting (non panic) state occurs when 120/230 VAC line power is not available. This illuminates about 20% via battery power, for an emergency lighting (non panic) state.

In correlation with the above mentioned voice commands, the base-station control-center networks with all the 'light/intercom' systems, identifying each individual system and its state as the case may be, the battery level, the functionality (to include query and test). Further, the base-station control-center also enables fast and easy assignment to each individual light fixture in the network, and volumes to be set for each of a light/intercom system.

Other objectives of the present invention for an improved LED light/intercom system is incorporating an intercom means into the 'bulb envelope' housing, while maintaining substantially the standard style and shape of the conventional light bulb housing.

Another objective is to incorporate the present invention into any style/type/shape housing of conventional light bulbs, lighting fixtures or lamps; making the improved system disclosed herein, easily a direct replacement for any prior art devices preexisting.

One further object in said housings will have partitions, separating areas of the internal space. Typically, these spaces; a LED light interior with a processing/speaker/memory/RF communications space, and, a microphone and voice recognition electronics/word library/battery chamber.

Yet another objective of the present invention for an improved LED light bulb system is having a speaker for audible emitting user communication.

Another objective is for the same microphone listening device mentioned above, would listen for audible speech commands.

One other object is the recognition of speech commands; for lighting and intercom purposes.

A further objective is a rechargeable battery power source. The battery source having a dormant state until the end user would cause a 'one-time' activating means initialized at instillation. The rechargeable battery, to keep alive all necessary circuitry during periods when VAC Line power is not available. The battery is always kept at peak capacity when the line voltage is present, and therefore is ready to cover periods when the VAC line voltage is off One other object is a microprocessor or ASIC (application-specific integrated circuit) mean to control universally all aspects of operation of the present invention.

Another object is to restrict circuitry by selectively powering the system of the present invention, while it is in a 'quiescent' state. That is, a state where the system is not in a lighting or an intercom active state, and therefore can power-down unneeded drains on battery operation.

One further objective, of the present invention for an improved LED light bulb system is to give audible notice when there is a low battery situation, the device would 'chirp' as conventional, usually in battery operated devices if the battery gets too low. That is, emit a very short duration pulse of sound, for example once per minute. To correct this low battery situation, the user would simply turn the present invention system, lamp or fixture, ON (providing AC Line power) for a short period of time. This would sufficiently re-charge the battery and chirping would immediately stop.

One other objective of the present invention for an improved LED light bulb system, is to communicate via RF short range signaling to other network devices in the light/intercom system.

Another object of the present invention is an optional base station means to program, monitor and display all light/intercom systems in the building network area (such as a home); giving control and information to the user that is unavailable by any other means. Such base station programming means utilizing a unique coding system to establish identification of the device manufacturing iteration, a house code, a unit number and location designator, and, a light/intercom coding ID category.

One other object is a networked 'black-box' device, sharing the same coding ID, to provide connectivity with cellular, land-line and computer means; to give out-of-network control for incoming or out-going purposes, to the hands free voice command of the light/intercom system controls. Such black-box can be incorporated into the base-station, or other convenience technology of a third party.

There is an objective to have a means to register and assign a 'coded ID' to each individual system in the network (Personal House Code, Zone-#, Location Description, Type of Fixture, Unit-#, Light/Intercom Category, etc.) making unique, and immediately identifying, which unit(s) status.

In considering a light/intercom alternate embodiments, other objectives are to utilize the devices microphone for a voice control, to recognize commands. Commands that establish a unique pattern of speech having a pattern; 1-an awareness/trigger part, 2-a correlative part, and 3-a directive part. An example of such an objective command is . . . "light-table-dim" spoken in any combination ("dim-table-light," or "table-dim-light"). Meaning, the 'light(s)' (awareness/trigger) on the 'table' (correlative) object in a room full of different lights such as ceiling, floor, wall, etc., and, go to 'dimmer' setting (directive).

Said light/intercom alternate embodiment has another objective to have an initialization and change routines, that would easily set-up or change modes of operation. Such modes as AUTO mode, TIMER mode or RESET (no or 'none'/'null' mode), and TEST to set-through the system's functionality; that allow added convenience for the user. These modes can make illumination of a home or structure to turn lights on (with pre-set dimming levels) and off with a number of useful features including volume settings. The routines would flash white LED's (once or twice) indicating entering a program means, and, flashing the LED's (once or twice) indicating a change of modes is successful when leaving the program routine.

An objective is also to have temporary commands to the above preset modes. Such commands as ON, OFF, DIM, BRIGHT, NIGHT, PRESET and EMERGENCY, would cause lighting to alter the preset as verbally commanded.

The directive would maintain until the next preset event was to happen and lighting goes back to a schedule predetermined.

The objective for each 'directive' command is defined as follows instructions:

a. ON=system LED illumination too full 'on',
b. OFF=system full off',
c. DIM=if system is 'off, illuminate to 80%, if system is 'on' decrease illumination by 20% for each DIM command,
d. BRIGHT=increase illumination by 10% for the first-of commands, then by 20% for each additional BRIGHT command,
e. NIGHT=system to go-to predetermined setting (ON, OFF or DIM),
f. PRESET=system to go-to predetermined setting (ON or DIM),
g. EMERGENCY=system LED illumination in two actions; too full 'on' flashing if 120/230 VAC line power is available, or else use 20% illumination for battery operation, in the case of a power failure.

In the case for the dim or bright objective, the lights would dim or brighten by 20% for example, for each command. In this scenario, if a ceiling light was preset to an intensity of 80%, a DIM command would cause the fixture to temporarily dim down to 60% until the next scheduled lighting event.

Other objective for an intercom state, is to listen for the verbal commands to establish communications as follows:

INTERCOM-ACTIVE=(a first user making a request) awake all devices in the system with a 'bing' tone, and, followed by broadcasting any speech, up to five seconds, by first user to all network devices,
INTERCOM-ON=(a second user responding to a first user request) connecting 'only' the first and second users local system devices; followed by second user's speech (up to five seconds),
INTERCOM-RECORD=(a first user making a request) the device would awaken with two 'bing' tones; followed by a ten second period of recording time, for a message, to be saved to memory. At end of record time, the local unit would transmit to all network devices said message to be stored for future use,
INTERCOM-PLAY (MESSAGE)=(a first user making a request) the device would awaken with two 'bing' tones; followed by playing-back any stored message,
INTERCOM-CANCEL=(a first user making a request) the device would exit any listening routine with a 'bong' tone,
INTERCOM-PHONE=(a first user making a request) the device would awaken with a 'bing' tone, and, connect to an optional land-line or cellular line (WiFi, LAN, Computer) if available for out-going phone call,
INTERCOM-ANSWER=(a first user making a request) the device would awaken with a 'bing' tone, and, connect to an optional land-line or cellular line (WiFi, LAN, Computer) if available for incoming phone call.

One further objective of the present invention is to, construct the housings in two parts; a LED/processor/speaker electronics housing Part-A, and, a microphone/voice recognition/voice library housing Part-B. The second part having a means to insert the rechargeable battery. When the two parts are 'snapped' together, they become electrically active and ready for service when installed into a fixture; prepared to give illumination for lighting, and, intercom for communication, as the device may be equipped for such detection means. Said activation, would immediately communicate its presence to the available base-station control-center in the network.

Another objective is also for the improved system LED light bulb, to receive commands from a base-station control-center; where all the commands and feature listed above in other objectives, can cause lighting effects remotely, for example from the master bedroom via RF communications; such as blue-tooth or ZigBee. In this case, the user would verbally command the base-station control-center and each LED light/intercom device would respond appropriately, giving full control of all units in the network. It is explicitly understood that each individual LED light light/intercom device still can communicate back to the base-station control-center when necessary for intercom communications.

Finally, an object of an improved light bulb (light, lamp or fixture)/intercom device, is making obsolete the use of an on/off switch; as is conventionally conceived. Such feature is particularly useful when the present invention is installed as part of a hard-wired device.

The present invention takes advantage of all these objectives by directly replacing a conventional light bulb, configured in any conventional style or shape, with an improved LED light bulb incorporating an intercom means (with all hands-free voice command and control); by having a rechargeable battery always available and ready for both emergency lighting and intercom communication, when VAC Line power is not available. The improved device would be constructed to all existing lighting lamp configurations, making them easy to replace existing conventional lighting and thus make it easy to up-grade the home or building. By having an optional base station(s) in or around the main places a user would find convenient (such as the master bedroom, kitchen or family room, or crossroads of activity) and would display exact locations and type/category of light/intercom systems that became activated.

Any disadvantages of prior art listed earlier are all overcome and the user of the present invention can remove older conventional lighting. The improved LED light bulb with built-in intercom system of the present invention, having hands-free voice commands further afford verbally telling lights, in various categories, to DIM, to BRIGHT to turn OFF or ON, or to a PRESET, to enter NIGHT mode or EMERGENCY mode(s), to predetermined settings, all uniquely solves problems that are not addressed by the prior art. And, a hands-free whole house network means to communicate, leave a message or re-play a message, and, optionally connect (via a black box) to a land-line or cellular line for out-of-network communications, or acceptation incoming out-of-network calls; all with simple intuitive voice commands. The improved light/intercom system make further use of a base-station control-center, that ties all these conveniences together, or, be merged with 'third-party' devices such a Amazon's Alexa/Echo or Google's Home (with compatible software).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

REFERENCES

Figure 1:
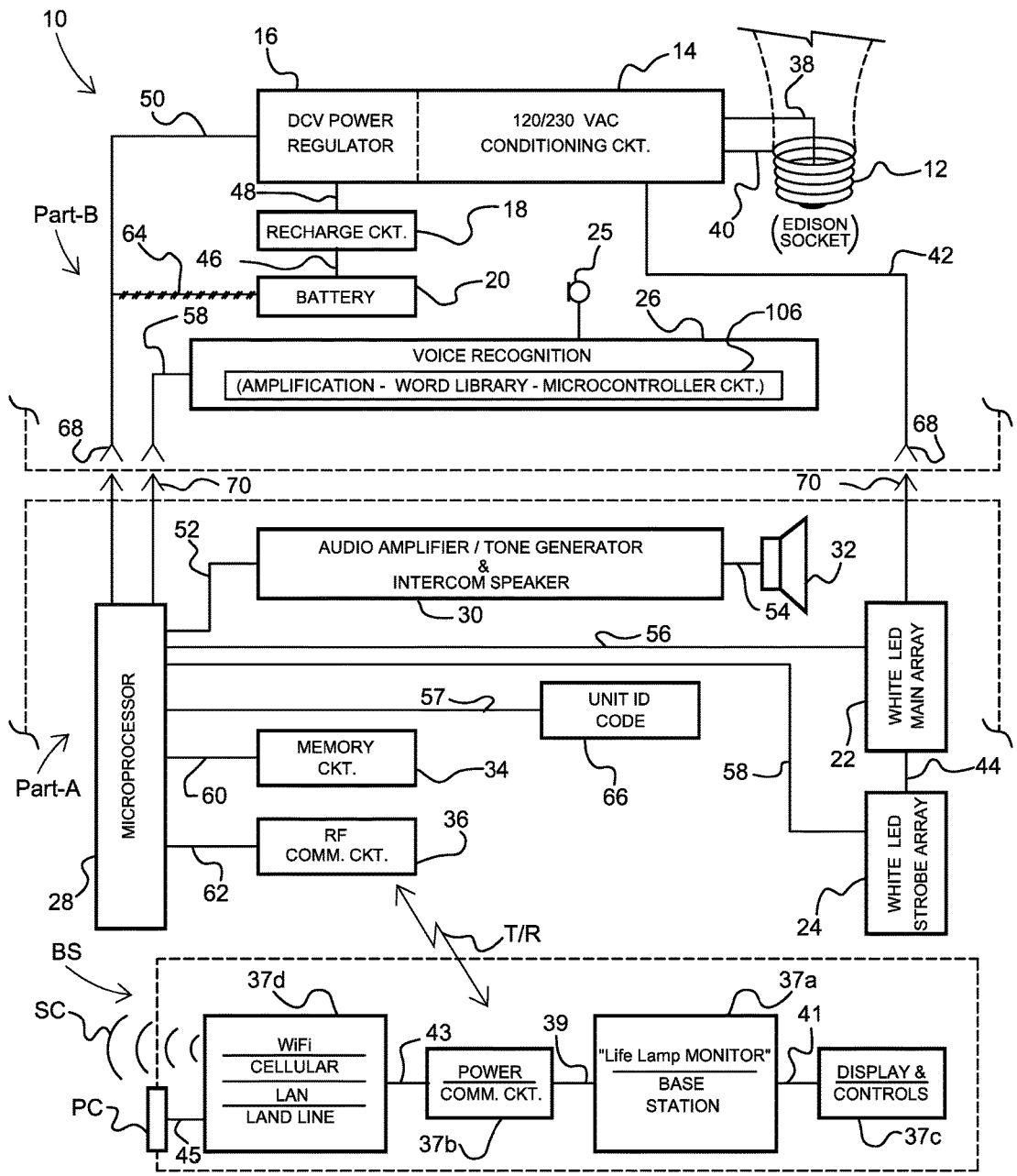
FIG. 1 is a block diagram of the present invention; wherein a light fixture for lighting and incorporating an intercom for communications, with a two-piece design, using microprocessor based components having hands-free voice recognition operating commands and controls, and, communicating in a network, to include with an optional base-station.

10 PRESENT INVENTION APPARATUS (light/intercom system)
Part-A LED/SPEAKER/PROCESSING
Part-B VOICE RECOGNITION/MICROPHONE/POWER
12 ELECTRICAL CONNECTION MEANS
14 CONDITIONING CIRCUIT
16 DCV POWER REGULATOR CIRCUIT
18 RECHARGE CIRCUIT
20 RECHARGEABLE BATTERY, (removable)
22 WHITE LED MAIN ARRAY
24 WHITE LED STROBE ARRAY
25 VOICE MICROPHONE
26 VOICE RECOGNITION (Amplification—Word Library—Microcontroller Ckt.)
28 CONTROL MICROPROCESSOR
30 AUDIO AMPLIFIER/TONE GENERATOR CIRCUIT
32 SPEAKER
34 MEMORY
36 RF COMMUNICATIONS CKT.
BS BASE-STATION
37a BASE-STATION (electronics)
37b BASE-STATION (power ckt)
37c BASE-STATION (display & controls)
T/R RF TRANSMIT/RECEIVE SIGNALS
SC SIGNALS (WiFi—Cellular)
PC PHYSICAL CONNECTIONS (PC—LAN—Land Line)
38 LINE (interconnecting)
39 LINE (interconnecting)
40 LINE (interconnecting)
41 LINE (interconnecting)
42 LINE (interconnecting)
43 LINE (interconnecting)
44 LINE (interconnecting)
45 LINE (interconnecting)
46 LINE (interconnecting)
48 LINE (interconnecting)
50 LINE (interconnecting)
52 LINE (interconnecting)
54 LINE (interconnecting)
56 LINE (interconnecting)
57 LINE (interconnecting)
58 LINE (interconnecting)
60 LINE (interconnecting)
62 LINE (interconnecting)
64 LINE (interconnecting)
66 UNIT-ID CODE
68 CONNECTOR, (female, receiver)
70 CONNECTOR, INTRA-PART, (male, pin)
72 LIGHT-DEFUSING REFLECTOR
74 ELECTRONICS CASING
75 FIXTURE RETAINERS
76 MIC VENTS (for microphone sound)
78 SPEAKER VENTS (communications)
H-A HOUSING, (Edison style, A-19 envelop light bulb)
H-B HOUSING, (projector 'flood' style, BR-30 envelop light bulb)
H-C HOUSING, (track style light fixture)
H-D HOUSING, (recessed style)
H-E HOUSING, (nightlight style)
80 PART-B HOUSING COVER
82 COVER SLOTS (for alignment pins)
84 COVER HOLE (for battery placement)
86 PART-A ALIGNMENT PEGS
88 PART-A CATCH
90 PART-B PUSH-TABS
91 DIRECTIONAL ARROW (together to assemble)
92 PART-B RETAINER CLIP
93 DIRECTIONAL ARROW (inward to release tabs 338)
94 PART-B LATCH HOLDER
95 DIRECTIONAL ARROW (apart to separate)
96 BATTERY +/− ELECTRICAL CONTACTS
98 PCB (+) CONTACT
100 PCB (−) CONTACT
102 LED PCB & HEAT SINK
104 PART-A PROCESSOR ELECTRONICS PCB
106 AMPLIFICATION-WORD LIBRARY-MICROCONTROLLER (voice recognition)
108 PART-A ELECTRONICS HOUSING BASE 110 PART-B RETAINER HOUSING
112 PART-B CONTROLLER ELECTRONICS PCB
114 COMMANDS FROM BASE-STATION
116 INTRA-PCB CONNECTOR
118 LISTEN FOR VOICE
120 BROADCAST SPEECH
122 ILLUMINATION (white LED main array 22)
124 ILLUMINATION (white LED strobe array 24)
126 BROADCAST SPEECH
128 LISTEN FOR VOICE
130 MIC/SPEAKER VENTS, (Base-Station)
132 MENU—ALL SYSTEM OK
134 MENU—INTERCOM EXAMPLE, Laundry Room
136 MENU—INTERCOM EXAMPLE, Garage
138 MENU—INTERCOM EXAMPLE, Basement
140 MENU—PROGRAM MODE
142 MENU—SYSTEM CONFIGURATION
144 MENU—QUERY SYSTEM
146 MENU—LOW BATTERY NOTIFICATION
148 UNIT INTERCOM BE INITIATED
150 RF SIGNAL RANGE (initial unit)
152 1ST REPEAT COMM SIGNAL
154 1ST REPEAT UNIT TRANSMIT RANGE
156 2ND REPEAT COMM SIGNAL
158 2ND REPEAT UNIT TRANSMIT RANGE NETWORK NETWORK (home structure)
R-1 EXAMPLE ROOM-1 (Garage)
R-2 EXAMPLE ROOM-2 (Kitchen)
R-3 EXAMPLE ROOM-3 (Front Hall)
R-4 EXAMPLE ROOM-4 (Living)
R-5 EXAMPLE ROOM-5 (Master Bedroom)
R-6 EXAMPLE ROOM-6 (Upper Hall)
R-7 EXAMPLE ROOM-7 (Kid's Bedroom)
R-8 EXAMPLE ROOM-8 (Laundry Area)
R-9 EXAMPLE ROOM-9 (Basement—West End)
R-10 EXAMPLE ROOM-10 (Front Door)
160 DIAGRAM OF SEQUENCE
162 SYSTEM TASK
164 SYSTEM TASK
166 SYSTEM TASK
168 SYSTEM TASK
170 SYSTEM TASK
172 SYSTEM TASK
174 SYSTEM TASK
176 SYSTEM TASK
178 SYSTEM TASK
179 START OPERATION OVAL
180 COMMANDS FROM BASE-STATION
182 PROGRAM INITIALIZATION PROCESS (FIG. 12)
184 RESET PROCESS
186 INTERCOM COMMAND-?
188 LISTEN FOR 'INTERCOM' COMMAND PROCESS
190 COMMAND HEARD-? (intercom)
192 GO TO INTERCOM ROUTINE (FIG. 14)
194 (not used)
196 (not used)
198 LISTEN FOR 'LIGHTING' COMMAND PROCESS
200 TRIGGER HEARD-?
202 CORRELATIVE HEARD-?
204 DIRECTIVE HEARD-?
206 CHANGE HEARD-?
208 CHANGE MODE PROCESS (FIG. 13)
210 TIMER=3 SECONDS-?
212 EXECUTE LIGHTING COMMAND PROCESS
214 TRIGGER WORD (awareness/action)
216 CORRELATIVE WORDS (objectives)
218 DIRECTIVE WORDS (instructions)
220 START INITIALIZATION OVAL
222 POWER CYCLED 'ON/OFF/ON' PROCESS (within 750 milliseconds)
224 FLASH WHITE LED ARRAY ONCE (program active)
226 LISTEN FOR LIGHTING COMMANDS PROCESS
228 TRIGGER WORD (light) HEARD-?
230 CORRELATIVE (ceiling) HEARD-?
232 CORRELATIVE (floor) HEARD-?
234 CORRELATIVE (table) HEARD-?
236 CORRELATIVE (wall) HEARD-?
238 TIMER=5 SECONDS-?
240 SAVE CEILING CONFIGURATION PROCESS
242 SAVE FLOOR CONFIGURATION PROCESS
244 SAVE TABLE CONFIGURATION PROCESS
246 SAVE WALL CONFIGURATION PROCESS
248 FLASH WHITE LED ARRAY ONCE & EXIT (command saved)
250 END INITIALIZATION PROCESS OVAL
252 START CHANGE MODE OVAL
254 ENTER ROUTINE-BASE OPERATION PROCESS
256 FLASH WHITE LED ARRAY TWICE (program active)
258 LISTEN FOR LIGHTING MODE COMMAND PROCESS
260 DIRECTIVE (auto) HEARD-?
262 DIRECTIVE (timer) HEARD-?
264 DIRECTIVE (reset) HEARD-?
266 DIRECTIVE (test) HEARD-?
268 SAVE AUTO-MODE CONFIGURATION PROCESS
270 SAVE TIMER-MODE CONFIGURATION PROCESS
272 SAVE NO-MODE CONFIGURATION PROCESS
274 TEST UNIT (functionality) PROCESS
276 TIMER=5 SECONDS-?
278 FLASH WHITE LED ARRAY TWICE & EXIT (command saved)
280 END CHANGE MODE OVAL
282 OVAL=START INTERCOM ROUTINE
284 INTERCOM INITIALIZATION
286 LISTEN FOR INTERCOM COMMAND
288 "INTERCOM" HEARD-?
290 TIMER=5 SECOND-? (window)
292 "ACTIVE" HEARD-?
294 INTER 'ACTIVE' ROUTINE (FIG. 15)
296 "RECORD" HEARD-?
298 INTER 'RECORD' ROUTINE (FIG. 16)
300 "PLAY" HEARD-?
302 INTER 'PLAY' ROUTINE (FIG. 17)
304 "PHONE" HEARD-?
306A INTERCOM 'PHONE' ROUTINE (outgoing request FIG. 18)
306B INTERCOM 'PHONE' ROUTINE (incoming request FIG. 19)
308 OTHER COMMANDS
310 FLASH WHITE LED & CREATE 'BING' TONE
312 FLASH WHITE LED & CREATE 'BONG' TONE
314 END INTERCOM ROUTINE
316 TRANSMIT 'BING' (to signal at all unit in network)
318 LISTEN FOR RESPONSE COMMAND
320 RESPONSE "INTERCOM" HEARD-?
322 TIMER=5 SECOND (window)
324 ALLOW 'TWO-WAY' COMMUNICATION (between devices)
326 LISTEN "SILENCE" HEARD-?
328 LISTEN "CANCEL" HEARD-?
330 RUN ROUTINE 'RECORD MESSAGE'
332 RECORD UP TO 10 Sec. MESSAGE
334 LISTEN "SILENCE" HEARD-?

338 TIMER-5 Sec. (window)
340 STORE "SPEECH" MESSAGE (in memory)
342 TIMER=10 Sec. (window) max length of message
344 SEND MESSAGE TO ALL (devices in network) for local storage
346 LISTEN "CANCEL" HEARD-?
348 RUN ROUTINE 'PLAY-BACK MESSAGE'
350 PLAY-BACK STORED MESSAGE ROUTINE
352 PLAYING MESSAGE
354 LISTEN "CANCEL" HEARD-?
356 MESSAGE END
358 'ERASE' MESSAGE
360 ERASING MESSAGE (transmit erase command to all units
362 RUN ROUTINE 'CONNECT WITH PHONE' (out going)
364 CONNECT WITH PHONE REQUEST
366 DIAL NUMBER REQUEST
368 LISTEN "CANCEL" HEARD-?
370 TIMER=5 Sec. (window) max length of silence
372 CONNECTION SUCCESSFUL
374 TRANSMIT/RECEIVE SPEECH TRANSACTION
376 LISTEN FOR 'END' HEARD-?
378 SILENCE TIMER=30 SECOND TIME-OUT (auto hang-up)
380 RUN ROUTINE 'CONNECT WITH PHONE' (incoming)
382 REQUEST CONNECT WITH PHONE
384 'SPECIAL CODED-PIN'
386 LISTEN FOR 'SILENCE' HEARD-?
388 TIMER=5 SEC (window)
390 CONNECTION SUCCESSFUL
392 TRANSMIT/RECEIVE SPEECH TRANSACTION
394 LISTEN FOR 'END' HEARD-?
396 SILENCE TIMER=30 SECOND TIME-OUT (auto hang-up)

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A networked improved LED light/intercom system 10 and method with voice command control, and a base-station; all having a hands-free intercom communications means, is referenced in FIGS. 1-19.

The networked light for illumination and intercom for communications in a single housing system 10 and method, with voice command and control, hands-free. The system in a housing is configured to conventional 'looking' lamp, bulb, fixture, lighting devices, suitable for a direct replacement of conventional illuminating devices typical found in homes or buildings. A network of such voice command and control systems may be further monitored and controlled from a base station that facilitates programming, communications, and higher functionality therebetween.

Further, the system 10 provides speech recognition for powering on and off, dimming, brightening, and adjusting the lighting to preset, night and emergency settings. The voice recognition command controls the intercom to be active and attentive to requests, connecting two or more locations within a home or building structure, for speech exchanges in communications, via radio frequency transmitting and receiving of signal messages between the individual light and intercom system devices within a network of devices.

As referenced in FIG. 1, the light/intercom system 10 provides multiple systems, arranged in a network throughout a house or office, or any building, that are synchronized to another and responsive to voice recognition command and control. The block diagram for a light/intercom system 10 of the present invention having a two-part assembly design housing structure; LED/speaker/processing Part-A, and, a voice recognition/microphone/power circuit Part-B. The 'two-part assembly' configuration allow a rechargeable battery 20 to be inserted into the assembly before Part-A and Part-B are coupled. Part-B having additional components, a voice recognition circuit 26 (with amplification-word library-microcontroller circuitry 106) and a voice microphone 25.

The voice recognition circuit 26, comprising of a multi-stage amplification means, a word (vocabulary) library 106 means and a microcontroller means, will be discussed in more detail later. Part-B further comprises a connector means with female receiver connections 68. Part-A, having intra-part male pin connectors 70, which will align with Part-B connector 68, when the two parts are coupled making electrical union possible. Appropriately, interconnecting lines 42, 50 and 58 connect these two assemblies respectively.

An electrical connection means 12, conditioning circuit 14, a DCV power regulator 16, a recharge circuit 18, rechargeable battery 20, a microphone 25 and, a voice recognition 26 circuit with amplification means, word library and microcontroller 106, make up the remainder of the Part-B assembly.

A control microprocessor 28, an audio amplifier/tone generator 30, an intercom speaker 32, a memory 34 means, a radio frequency (RF) communications 36 means, a white LED main array 22 and a white LED strobe array 24 make up the remainder of the Part-A assembly. A series of lines 38, 40, 42, 44, 46, 48, 50, 52, 54, 56, 57, 58, 60, 62 and 64 are shown providing interconnection to the various blocks or the diagram in the two-part design. The heart of processing and communications is a unit-ID 66 code (which will be disclosed in detail in later figures).

The conditioning circuit 14 supplies 120/230 VAC power to DCV regulator 16 and white LED main array 22 and white LED strobe array 24. The DCV power regulator provide commercial power for charging the battery 20 by the recharge circuit 18, and all of the other control components 26, 28, 30, 34, 36. In operation, when 120/230 VAC (Line Voltage) is available and present at the electrical connector 12, the system functions as follows: Conditioning circuit 14 steps-down and rectifies the VAC Line Voltage first, to the high intensity light emitting diodes (LED's) in the arrays 22 and 24, providing illuminances in the radiation of visible light, and second, provide power to the DCV regulator 16 that supplies control power and the recharging of the battery as needed.

Thus, if the Line Voltage is OFF, or not present, the battery 20 will supply all necessary power to circuits 26, 28, 30, 34, 36 and the LED strobe array 24. It is important to understand that the white LED's strobe arrays 24 function with, and exactly the same as, white LED's in the main array 22. Only when in battery mode of operating, do the white LED's strobe the array 24, remain functional, to conserve energy. A more detailed description of all these functions will be disclosed later.

The intercom features of the present invention are related to blocks 25, 26, 30 and 32, in FIG. 1. Together with the lighting related blocks 14, 22 and 24, comprise the light/intercom system 10, and will be fully detailed in the following figures below.

Before moving on, the inventors have identified a number of suitable manufacturers of the voice recognition 26 and 106 circuitries. Philips Semiconductor, Texas Instruments, Microchip Electronics, to name a few. Although there is no easy 'drop-in' integrated circuit that would exactly meet the needs of the present invention (especially considering the small space to fit all the electronics), it is anticipated that an 'application specific integrated circuit' (ASIC) would best suit for some components. In such an ASIC, there could be multi-stage (for example three) amplification, appropriate analog-to-digital conversion, memory word reference library (containing about 50-word vocabulary) and microcontroller; all in one 'small' package. This would allow very few input/output pins from/to the ASIC (from the microphone and to the system microprocessor 28, etc.), greatly reducing printed circuit board space and power consideration. Since the quantities in manufacturing the present invention are in the high numbers, and the desire to keep the purchase price of the system low, would make the ASIC scheme practicable and affordable. Further for 'special' words, learned (representation of the commands) by the light/intercom system 10 apparatus, and stored in the memory 34, would greatly benefit the utility of the device with respect to individuals with speech impediment or inflection; will be described in detail later in the disclosure.

The light/intercom system 10, arranged in a network throughout a house, office or building structure that are synchronized to one another both in lighting illumination and intercom communication. Multiple light/intercom system 10 units are tied together through an optional base-station control-center BS; whereby the light/intercom system 10 and base station BS communicate with each other to coordinate the features independently for each room. The light/intercom system 10 also provides voice recognition functionality to control, all hands free. This is operable through the speech voice recognition controller. The speech recognition controller is operationally integrated in a lighting lamp fixture, allowing a user to control various aspects of lighting and powering of the light/intercom system 10 through a plurality of predetermined voice commands and at least one voice pattern. Easy to remember voice commands, such as "on", "off", "dim", "bright", "preset", "night", and "emergency", etc., are picked up by a microphone and acted upon to facilitate operation of the lighting controls, and, "intercom", "active", "record", "play", and "phone", etc., operate the speech communications throughout the network.

Also, referenced in FIG. 1, is a base station BS comprised of a monitor 37*a* section, a power and comm 37*b* section, a display & controls 37*c* section and, an out-of-network connection 37*d* means; that facilitates communication between the network of light/intercom system 10 units. The base station BS is programmable based on a code assigned to each system. Additionally, the light/intercom system 10 provides speech recognition for powering on and off, dimming, brightening, and adjusting the lighting and intercom functions. Communication is accomplished via a T/R (RF transmit/receive signals) means, between the base-station control-center BS, power and comm ckt 37*b* and, the light/intercom system 10, RF comm ckt. 36. Although light/intercom system 10 can function all on its own in a network of like units, when they are coupled with the optional base-station BS, make an even more 'connected' network of usefulness. Part of this extended usefulness is via the features in out-of-network 37*d*, wherein WiFi, Cellular, Computer, LAN or Land-Line can be facilitated; as represented by wireless means, signal connections SC or physical connections PC respectively.

The base-station BS shown in FIG. 1, (as will be discussed in detail later and comprising 37*a*, 37*b*, 37*c*, 39*d*) can, either along with or be incorporated via software into, other 'conveniences' electronic devices. These devices, such as Amazon Corporation's Alexa/Echo system, or Google's Home system, etc., can further augment the base-station control-center of the present invention; making them even more useful.

Figures 2A, 2B:
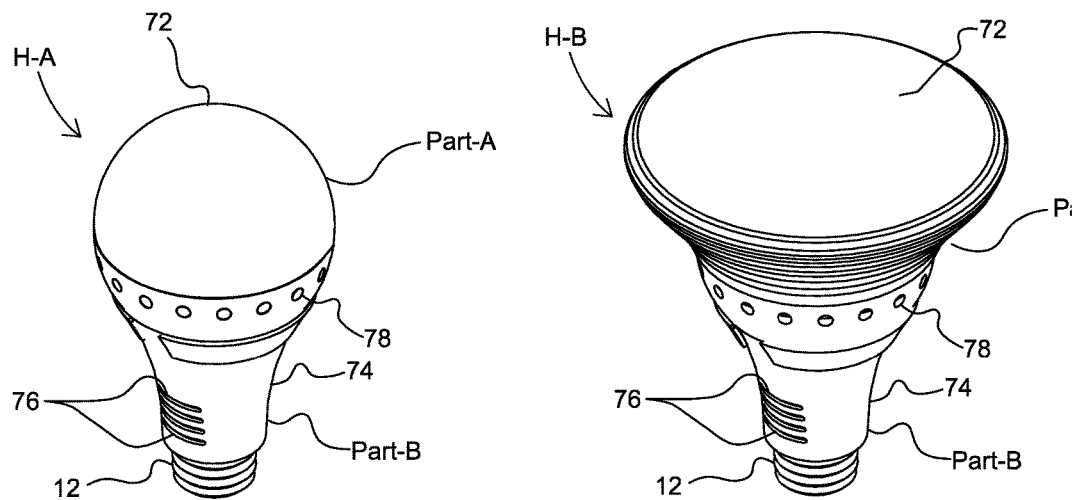
FIG. 2a is a perspective view illustration of the Edison A-19 style light bulb housing of a light/intercom system, in accordance with an embodiment of the present invention.
FIG. 2b is a perspective view showing the common projector 'flood' style, type BR-30 light bulb envelop housing of a light/intercom system, in accordance with an embodiment of the present invention.

Turning now to FIGS. 2*a* through 2*e*, wherein the light/intercom system 10 is configured in several conventional forms and styles; familiar to most people. In FIG. 2*a* is shown a perspective view of the outside of a common 'Edison' style, type A19 light bulb 'envelop', housing H-A. The housing H-A having electrical connector 12, as depicted in FIG. 1 earlier. A light-defusing reflector 72, an electronics casing 74, a series of mic vents 76 holes, and a speaker vents 78 holes are also shown. The light-defusing reflector 72 allows an even emission of illumination when the LED's of the main array 22, strobe arrays 24 are turned ON. The electronics casing 74 holds the operating components of the present invention in Part-B, having mic vents 76 holes to allow sound to enter and exit the housing H-A for the microphone 25. The speaker vent 78 holes also allows sound to enter and exit the housing H-A in Part-A.

Figures 2C, 2D, 2E:
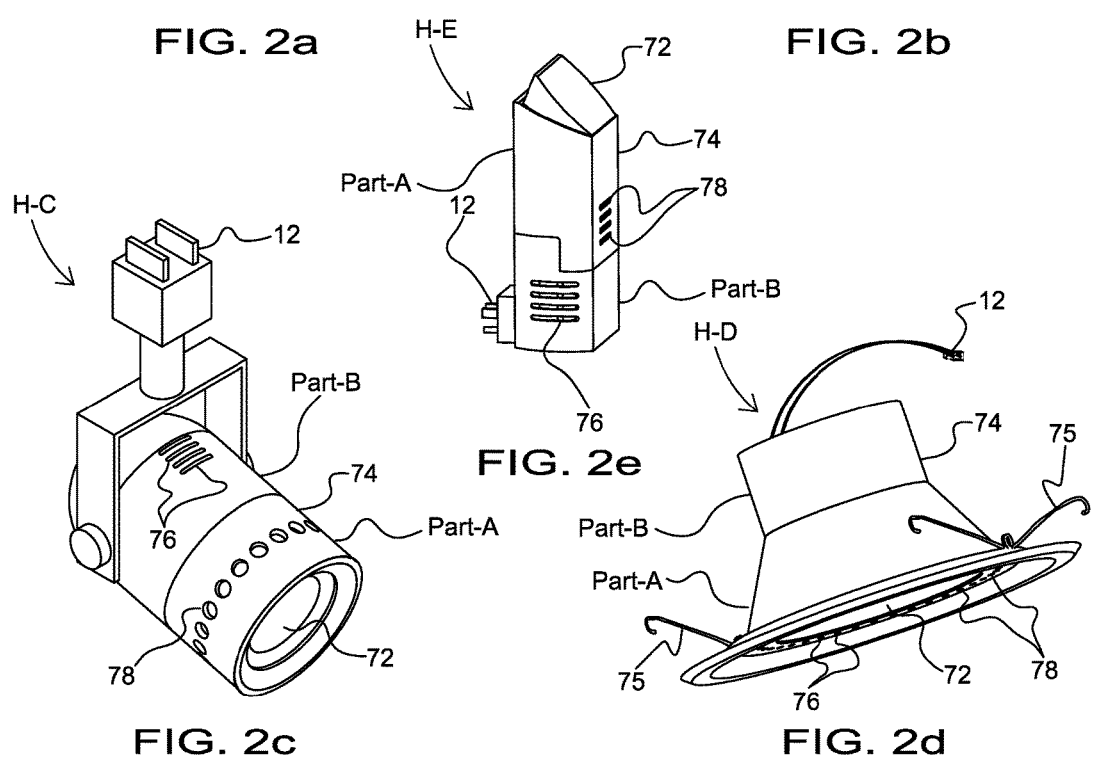
FIG. 2c is a perspective view showing the outside of a common 'track' style, light housing of a light/intercom system, in accordance with an embodiment of the present invention.
FIG. 2d is a perspective view showing the outside of a common 'recessed' style, light housing of a light/intercom system, in accordance with an embodiment of the present invention.
FIG. 2e is a perspective view showing the outside of a common 'nightlight' style, light housing of a light/intercom system, in accordance with an embodiment of the present invention.

FIGS. 2*b*, 2*c*, 2*d*, and 2*e* are similar in function and operation as disclosed in FIG. 2*a*; only the form has changed as follows. FIG. 2*b* being a perspective view showing the outside of a common projector 'flood' style, type BR-30 light bulb envelop housing H-B; FIG. 2*c* is a perspective view showing the outside of a common 'track' style, light housing H-C; FIG. 2*d* is a perspective view showing the outside of a common 'recessed' style, light housing H-D (note that fixture retainer 75 holds the recessed style light housing H-D in its ceiling canister (canister not shown in FIG. 2*d* for clarity of presentation); and, FIG. 2*e* is a perspective view showing the outside of a common 'night-light' style, light housing H-E. Each housing H-B, H-C, H-D and H-E respectively, holding the present invention of a light/intercom system 10 (as will be more clearly seen in FIGS. 3 through 5) and operating as disclosed in FIG. 1.

Figures 3A, 3B:
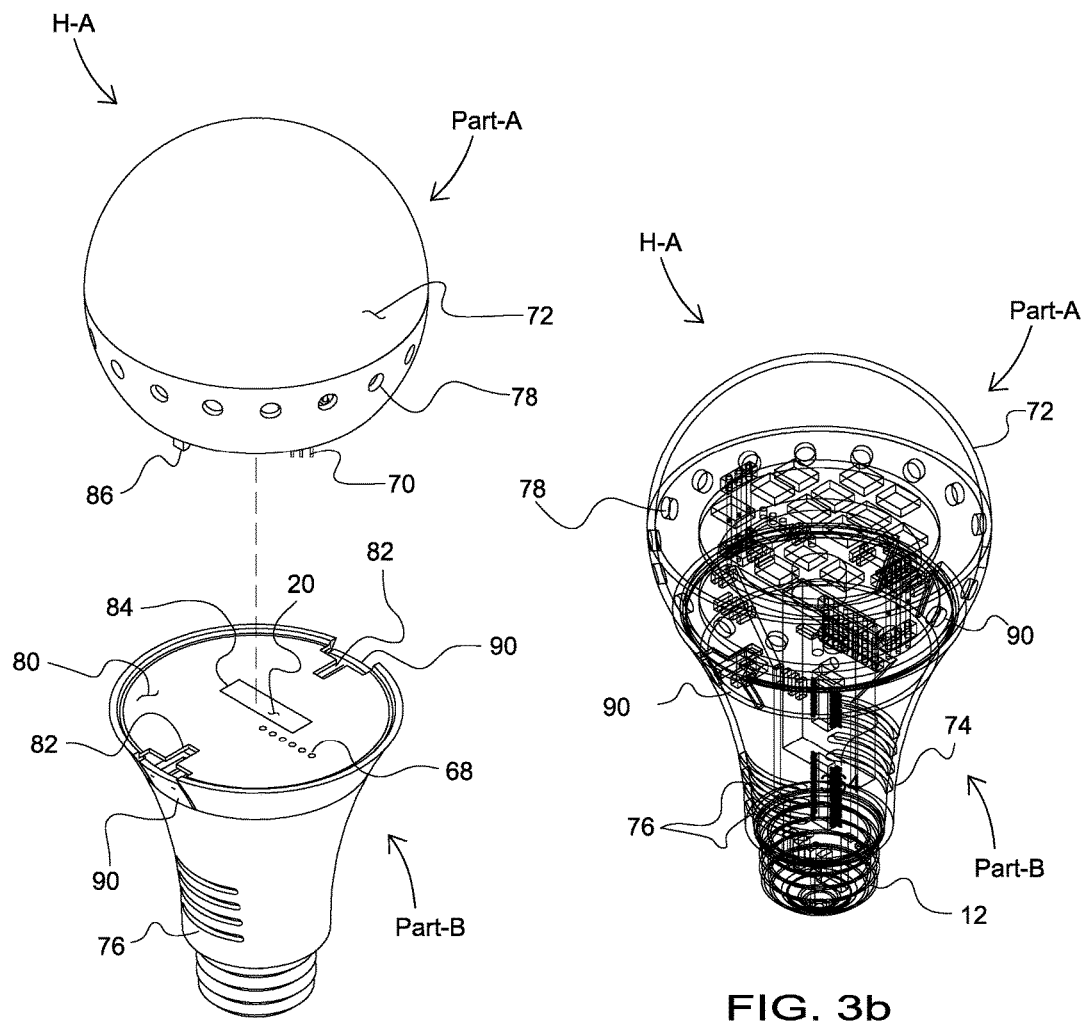
FIG. 3a is a perspective view showing the present invention with a two-piece design of a common 'Edison' style, type A19 light bulb envelop housing of the light/intercom system FIG. 2a, and, having the two sections separated, in accordance with an embodiment of the present invention.
FIG. 3b is a wire-frame isometric view, visually detailing internal structures of the modular design of the present invention of FIG. 3a, with the two sections connected together, in accordance with an embodiment of the present invention.

Moving to FIG. 3a is a perspective view, of the two-part design and showing H-A style housing of a light/intercom system of the present invention, before they are 'snapped' together. The Part-B housing cover 80 provides containment to the Part-B assembly, with having cover slots 82 to accommodate the Part-A alignment pegs 86 (when inserted through to the Part-B retainer clip 92 that will be discussed later). Also, the Part-B housing cover allows the intra-part connector pins 70 (of Part-A) to pass through to mate with the female connector receiver 68, making possible electrical union between the two Part-A and Part-B. The cover hole 84 (in Part-B housing cover 80) allows the battery 20 to be inserted into the Part-B housing; as was disclosed in an earlier discussion. A Part-B push tabs 90, when pushed inwardly, would release the two parts (Part-A and Part-B) from one another; to disassemble and gain access to the battery 20, or, to change components with compatible, light/intercom system 10 parts.

FIG. 3b is a wire-frame isometric view of the present invention in 'two-part assembly' of a light/intercom system, fully assembled (the two parts, Part-A and Part-B, snapped together) and ready for installation into a lighting fixture, disposed for service as a lighting device, and, an intercom communications device; with voice command and control. The wire frame view shows handily all of the components comprising the apparatus of the light/intercom system 10; into a single housing, of the H-A Edison style light bulb. The wire frame illustration also well presents the mic vents 76 and speaker vents 78, showing the facility of sound to enter and exit the system; in its proximity to the microphone 25 and speaker 32 respectively.

Figure 4:
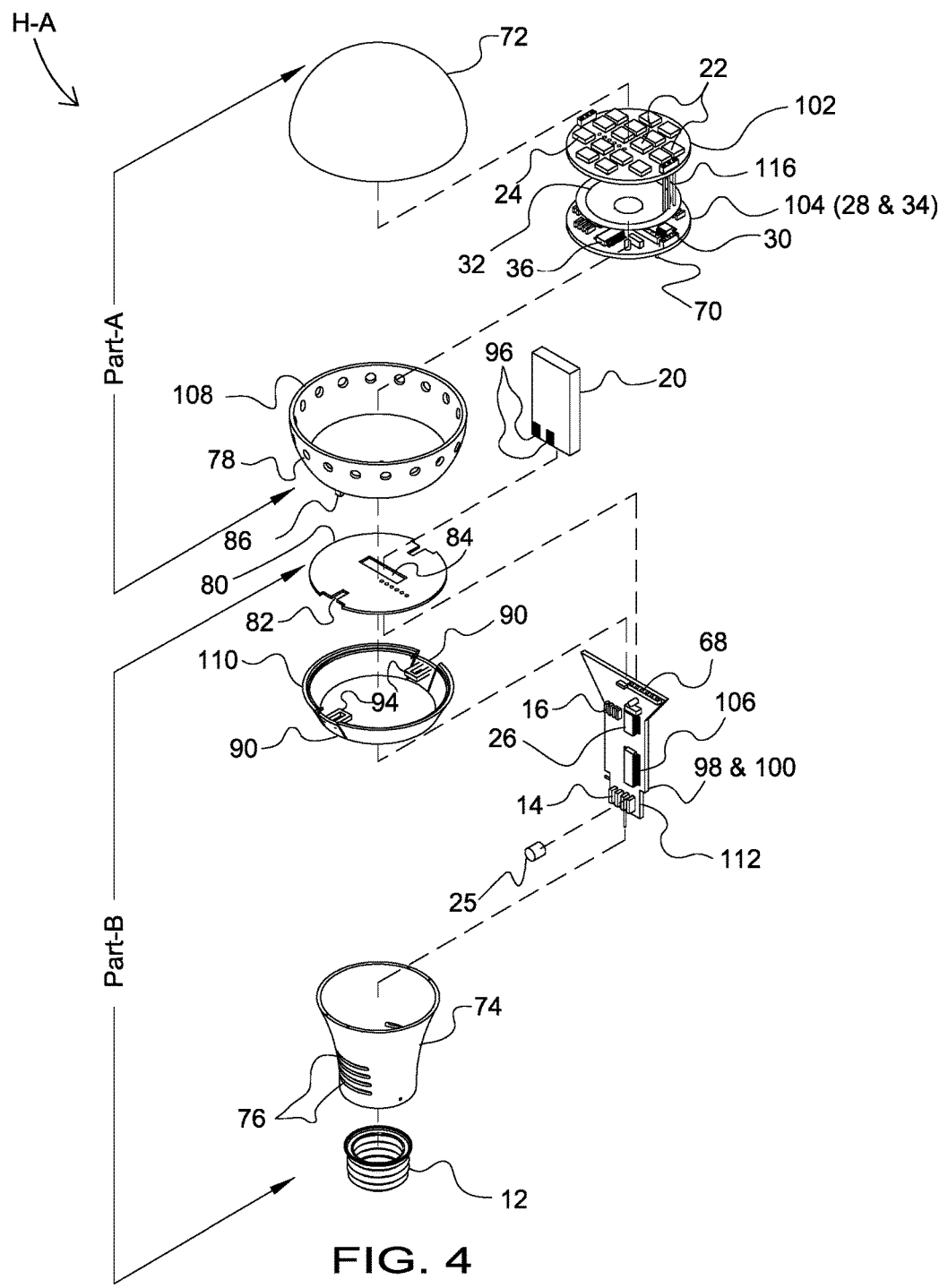
FIG. 4 is an exploded, perspective view of FIG. 2a showing all major components of a light/intercom system and their relationship to one another, in accordance with an embodiment of the present invention.

In FIG. 4 is seen an exploded, perspective view of FIGS. 3a & 3b, showing all major components and their relationship to one another and comprising a light/intercom system. The LED PCB and heat sink 102 (having disposed on it the white main LED array 22 and white LED strobe array 24) is electrically coupled to the Part-A processor electronics PCB 104 (via intra-PCB connector 116) and fits into the Part-A electronics housing base 108, with intra-part connector 70 pins sticking through the housing base 108. The processor electronics PCB 104 has disposed on it the control microprocessor 28, audio amplifier/tone generator circuit 30, speaker 32, memory 34 and RF comm circuit 36. The light-defusing reflector 72 dome is permanently affixed to the Part-A electronics housing base 108, after the above mentioned components are inserted at time of manufacture, and, when assembled, becomes the LED, communications, speaker and processing Part-A assembly.

The LED PCB and heat sink 102 is a mounting plate that is conventionally constructed with circuit current flow patterns on the LED top-side, and with a heat sink (such as aluminum) on the bottom-side. The number of high intensity LED's, in both the main 22 and strobe 24 arrays, are defined by the amount of luminescence desired. In this example of the A-19 style bulb, H-A of FIG. 4, are twelve of the white LED's in the main 22 and strobing 24 arrays, during normal lighting functions. It should be understood that any number of LED's, either greater or less, can be implemented on to LED mounting plate to facilitate any given housing configuration and desired lumens.

The voice recognition, microphone and power Part-B assembly, consist of electrical connector 12, attached to the electronics casing 74. A Part-B controller electronics PCB 112 is electrically connected to the connector 12 and provided 120 VAC power to the unit when available. The Part-B controller electronics PCB 112, having disposed on the upper edge, the female receiver connector 68 (to receive the matting pins of intra-part connector 70 of the Part-A assembly). Further disposed on the 112 PCB, are the voice recognition circuitry 26 (with amplification-word library-microcontroller circuitry 106), microphone 25 and the (+) contact 98, and (−) contact 100 to electrically couple with the rechargeable battery 20, +/− electrical contacts 96.

It is significant to note that there is incidental structure to hold the battery in place within the Part-B assembly, which is not shown in this illustration so as to provide a clearer presentation of the main components. After the Part-B controller electronics PCB 112 is installed into the electronics casing 74, the Part-B retainer housing 110 (with Part-B housing cover 80) is permanently attached to one another. The rechargeable battery 20 is intended to be inserted into Part-B cover hole 84, before the two assemblies Part-A & Part-B are attached by snapping together as above described.

As was disclosed before, the unit will be packaged and shipped with these three components (Part-A, Part-B and battery 20) not attached. The used will insert the battery and complete the assembly of the two parts before installing the improved LED light/intercom system 10 with voice recognition command and control. The 'snapping' together, will activate the electronics and the system becomes alive. Although this describes the preferred activation means of the present invention, for end user installation, other means can certainly be implemented. For example, the Part-A, Part-B and battery 20 can be fully assembled at the factory and electrical activation can be achieved by adding an isolation tape/ribbon 'pulling-out-means' at time of installation. The tape or ribbon, of course, would isolate the battery 20 +/− electrical contacts 96 from the PCS 112 assembly (+) contact 98 and (−) contact 100 until the device is ready to be installed. Removing the isolation tape or ribbon would electrically activate the system to be available for service.

One other note for the battery considerations, needs to be emphasized. The preferred battery technology, at the time of the present invention disclosure, is a lithium battery. However, newer battery technologies are in forefront for use. These technologies promise greater live, less time to charge and more safety in their use. The inventors fully recognize the potential of such new battery technologies, and will incorporate said newer battery advances when they become available for common use.

Figure 5A:
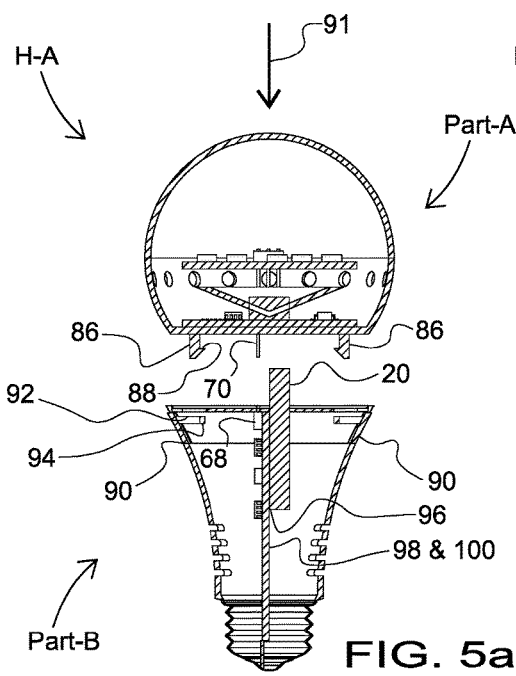
FIG. 5a is a cross-sectional illustration of an Edison style LED light bulb housing of a light/intercom system of FIG. 2a, showing the two-piece design separated, and with battery partially inserted, in accordance with an embodiment of the present invention.

FIGS. 5a, 5b, 5c and 5d are all cross-sectional illustrations of an Edison style light bulb housing H-A of a light/intercom system; showing a two-part design. In FIG. 5a is shown Part-A and Part-B assemblies separated, and with battery 20 partially inserted into Part-B section. Part-A having a Part-A alignment pegs 86, protruding from the underside of housing Part-A, and, having a Part-A catch 88 surface near the edge of the alignment pegs 86. Part-B has a Part-B 'flexible plastic' push-tabs 90, a Part-B retainer clip 92, and a Part-B latch holder 94. When the Part-A is aligned with Part-B to couple the two parts (as indicated via directional arrow 91), the battery 20 would first be inserted appropriately and by pushing the battery down into space provided and making electrical contact possible.

The Part-A alignment pegs 86 would engage with Part-B retainer clip 92 before the intra-part electrical connector pins 70 wound couple with connector 68 on the Part-B section. The retainer clip 92 of Part-B would 'bend' inward (being attached to the flexible plastic push-tabs 90) to accommodate the Part-A alignment pegs 86 until fully seated, when retainer clip 92 would 'spring' back to its original position and capture the alignment pegs 86 of Part-A on the catch 88 surface, with the Part-B latch holder 94 surface.

Figure 5D:
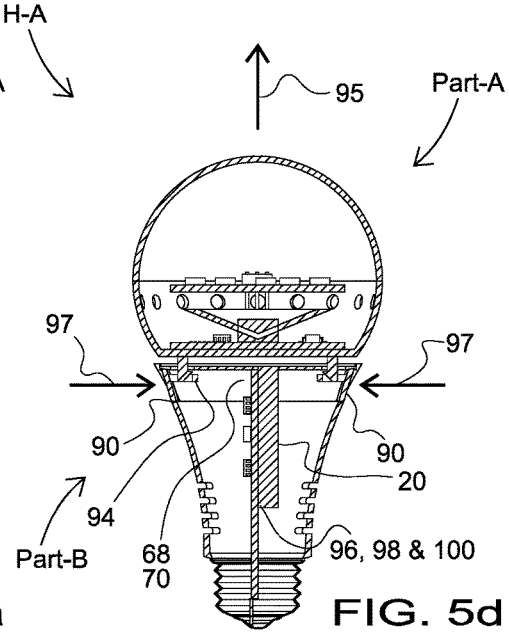
FIG. 5d is a cross-sectional illustration of the Edison style LED light bulb housing of a light/intercom system of FIG. 5c, showing the two-piece design in the process of being separated after the release, in accordance with an embodiment of the present invention.

At this point, the two assemblies, Part-A and Part-B, are 'snapped together' and fully coupled, secure and electrically unioned. It is also at this point that battery 20, having +/− electrical contacts 96 mate with printed circuit board, (+) contact 98 and (−) contact 100. See FIG. 5*d*, showing the battery fully seated and contacts 96, 98 and 100 matted. There will be more discussion on these +/− electrical contact later in this disclosure.

Figure 5B:
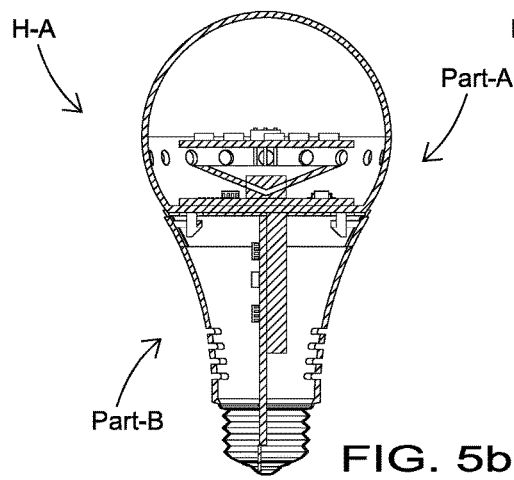
FIG. 5b is a cross-sectional illustration of the Edison style LED light bulb housing of a light/intercom system of FIG. 5a, showing the two-piece design fully assembled and battery making contact, in accordance with an embodiment of the present invention.

FIG. 5*b* shows the light/intercom system 10, of the two separate housings (Part-A & Part-B) of FIG. 5*a*, assembled to complete the system H-A. No other references are depicted in this figure so a clear cross sectional view can be better seen, exactly how the parts engage with one-another allowing them to snap together and be detachable.

Figure 5C:
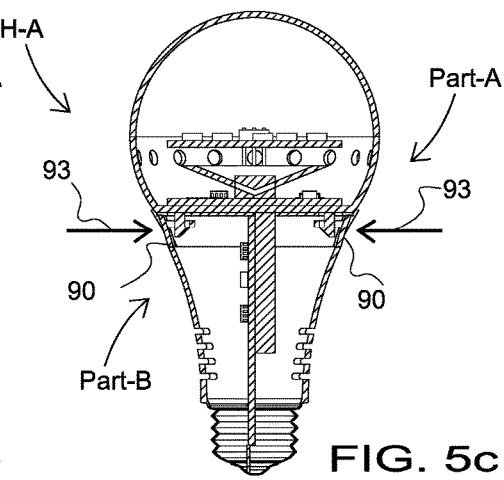
FIG. 5c is a cross-sectional illustration of the Edison style LED light bulb housing of FIG. 5b, showing the release mechanism of the two-piece design, getting ready to separate, in accordance with an embodiment of the present invention.

The cross-sectional illustration in FIG. 5*c* is of the Edison style light bulb housing H-A (light/intercom system 10) of FIG. 5*b*, showing the release mechanism of the two-part design, getting ready to separated. The Part-B flexible plastic push-tabs 90, when pushed-inward, as indicated by directional arrows 93, would release the latch holder 94 (of retainer clip 92) to the surface on Part-A catch 88 of Part-A alignment pegs 86.

Now in FIG. 5*d* is illustrated the housing Part-A and Part-B being separated after the release shown in FIG. 5*c*, as indicated by directional arrow 95. At this point the units can be separated. This feature can be useful should maintenance be necessary, or for example, to change a Part-B assemble with a new one; perhaps one with a different language library set for voice recognition or another functionality.

It is at this point, the inventors want to disclose other main element manufacturers, having suitable components to comprise an apparatus of the present invention. A suitable microprocessor 28 would be one of the Microchip Corporation, PIC series, such as their 8-pin, 14-pin or 20-pin models. Preferably one with built-in program memory, non-volatile memory and peripheral select ability, even one with communication means.

Each of these models can be programed, by any one skilled in the art, to produce the function describe throughout this disclosure referencing the system of the present invention of a light/intercom system 10, controlling the various circuits as indicated in FIG. 1. Microchip Corporation also make a suitable Bluetooth communications module (RF comm 36) ckt. that could directly 'drop-in' to the design. An amplifier would be a LM741 series can be by Texas Instruments. A suitable condenser microphone 25 would be a CME-5042PF-AC, manufactured by CUI, Inc.

Each of these housing types (H-A through H-E) would use different considerations in the number of LED's, the layout of LED's and the circuit's form as shown in FIGS. 2-5. There are many suitable manufactures of both the white and colored LED's for 'soft-white', (such as Cree, Lumileds, Osram, Vishay and Avago to name a few) offering hundreds of varieties. Anyone skilled in the art, could select a quantity of LED's and a circuit layout, along with VAC power conditioning that is ideal for any given LED choice; to result in a functioning light/intercom system 10 of the present invention.

Those skilled in electronics would be able to assemble such components configured to operate and function as described. It is highly desirable to miniaturize all said circuits indicated in FIG. 1, and as such the use of an ASIC (Application Specific Integrated Circuit) is most useful. The inventors would employ such ASIC technology into the present invention of a light/intercom system 10, substantially reducing the component count, when designing a particular end use device. This would further reduce power consumption extending operating time when VAC Line power is not available.

Although the inventors have disclosed five (5) styles of light bulbs and lamp fixtures, it is explicitly understood that the present invention of a light/intercom system 10 can be fitted into any light/lamp housing style or type of fixture. For example, a few other standard 'series' types are: A-Series, B-Series, C7/F Series, CA-Series, S-Series, F-Series, RP, MB, BT Series, R-Series, MR-Series, PS Series, AR-Series, ALR-Series, BR-Series PAR-Series, T-Series, BT-Series, ED-Series. Further there are the European Base E-Series, the Bayonet Series, the high voltage series as well as the low voltage pin series, and the G-Series including fluorescent tube. Clearly it is shown that an improved LED light/intercom system 10, depicted in five different configurations of commonly found lighting devices are sufficient enough, for anyone skilled in the art, to understand the invention, and, were only limited by the practical need to keep this disclosure shorter in length.

Further the disclosures that are seen in FIGS. 1 through 5, are of the preferred embodiment showing form and function, and, other embodiments could easily be envisioned to comprise the teachings of the present invention. The improved LED light/intercom system 10 can network with one-another fully automatically; functioning both as a 'command driven' lighting device and intercom communication device. The LED light/intercom system 10 will further be useful when coupled with the optional base-station control-center BS, that will be disclosed in detail in the following figures and teaching.

Figure 6:
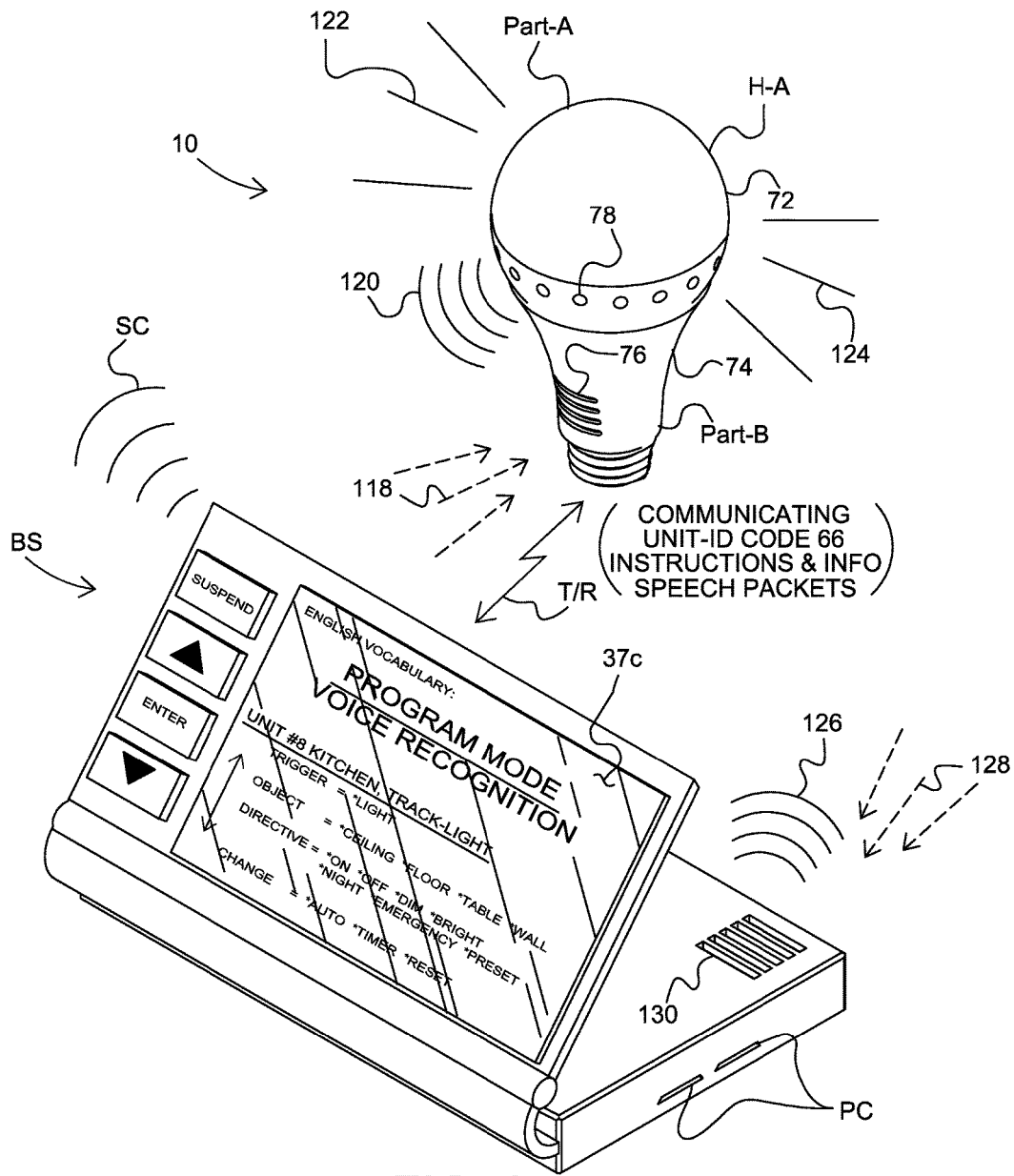
FIG. 6 is an illustration of the optional base-station (control-center), interacting with the two-piece improved LED light/intercom system, of the present invention, showing the program mode for the voice recognition menu, in accordance with an embodiment of the present invention.

Turning now to FIG. 6, is an illustration of the optional base-station control-center BS, interacting with the two-piece improved LED light/intercom system 10, of the present invention; showing the program mode for the voice recognition menu (displayed on display 37*c*), in accordance with an embodiment of the present inventions. A display & control 37*c* screen is running a routine to program the light/intercom system 10. Radio frequency R/F transmit & receive signal T/R engages with the light/intercom system 10 and establishes an identification code between the two; as will be more disclosed later. Note the LED light/intercom system 10 shows illumination 122 rays (being generated by the white main array 22) and illumination 124 rays (being generated by the white strobe array 24); portraying the 'light' aspects of the system.

FIG. 6 further shows a listen for voice 118 (being pick-up by the microphone 25 just inside the mic vents 76 holes), and, a broadcast speech 120 (emanating from the speaker just behind the speaker vent 78 holes); showing the intercom aspects of the light/intercom system 10 apparatus. Likewise, the base-station control center BS has a mic/speaker vents 130, a broadcast speech 126 and a listen for voice 128. Each of the independent LED light/intercom system 10 units and the base-station BS communicated to the users of the system, hands free, via these listen for voice 118 & 128, and broadcast speech 120 & 126 over the transmit/receive T/R signals (the exact protocol will be detailed later). There are other transmission means for a signal connection 'SC' means to facilitate WiFi or Cellular communications, and a physical connections PC means to connect to a computer, LAN or Land-Line. All these communications and connections will be detail later.

The battery operations of the base station BS, makes it portable, and thus, be carried about the home/building for network programing purposes. The base station electronics short-range RF communications means in the preferred embodiment, is of the Bluetooth technology as is all the light/intercom system 10 devices. It should be understood that other RF means, such as ZigBee or 'smart' appliance communication techniques could work equally as well. This communication is indicated by the transmit/receive signal arrows T/R referenced in the FIGS. 1 & 6, and, the listed H-A, H-B, H-C, H-D, and H-E elsewhere, together comprising a network of the present invention devices.

The FIG. 6 also illustrates of the base station BS display screen 37c shows an example of listed, improved LED light/intercom systems 10, identified by ZONE-# & UNIT-#, TYPE of lamp/fixture, and assigned locations. Each new light/intercom system 10 added to the network, must be registered with the base station BS through this menu. Registration of a system is accomplished, with the base station BS in close proximity and in program mode, by toggling VAC line power of the light/intercom system 10 to ON/OFF/ON, within one second (for example). The base station will recognize the light/intercom system 10 and down-load via. T/R, a unit-ID code 66; making it part of the base station BS network (as referenced in FIG. 1). The base station BS must be in the program mode and ready to acknowledge the signal produced by light/intercom system 10 at the ON/OFF/ON procedure. If the light/intercom system 10 was moved to a new location, it can be re-programmed in the same manner, to up-date the network.

The following is a discussion of the unit-ID code 66, in an example. Each light/intercom system 10 has an eight-character code. The first two hex digits are identifying it as a manufacturing iteration and model (M-I) cypher. The next three hex digits are the house identifier (HOUSE) cypher. Followed by a two-digit unit identifier (UNIT) cypher and ending with a single digit category (GROUP) cypher. When being programed, via a base-station BS, the base-station assigns a HOUSE code of three hex digits and a UNIT-ID of two hex digits. The single GROUP code is for data type e.g., type (light or intercom), command, instruction, message packet of speech, state, 'repeat/relay' data, etc. Below is a UNIT-ID Code Communications Table-1 for illustrating of the improved LED light/intercom system 10, eight hex character unit-ID code 66, and its permutations possibilities.

| UNIT-ID Code Communications Table-1 | | | | |
|---|---|---|---|---|
| | M-I code | HOUSE code | UNIT code | GROUP code |
| # CHARACTERS: | XX | XXX | XX | X |
| POSSIBLE VARIATIONS: | 256 | 4096 | 256 | 16 |

With every communication event between a base-station BS and any light/intercom system 10, the unit-ID code 66 immediately identifies it with the manufacturing model, the home it is assigned to, the type/style of lamp/fixture it is, and what type of data transfer category group. For example, and referencing FIG. 6, if the light/intercom system 10 was commanded to "DIM-TABLE-LIGHT", and a ceiling fixture was also within hearing range, unit-ID code would understand that the command was for the 'table' unit, not the ceiling unit. Likewise, if the command was "INTERCOM-ACTIVE-LAUNDRY", first light/intercom receiving the command (and by venture of the unit-ID code 66) transfer an intercom request to the said location identified as 'laundry' in the network, present the 'bing' tone and make a voice communications connection between the two locations.

There are several figures disclosed later to detail the exact process for each light or intercom transaction.

The base-station BS is uniquely an important 'center' of information as part of the present invention network of devices, it is not necessary for a basic system of an improved LED light/intercom system 10 to function. That is, if there were just two light/intercom system 10 units (or a few more) in a network, and the user felt no need for the added utility of the base-station BS, then, such configured basic system would function, but without the ability to 'customize' the 'HOUSE' aspects of the unit-ID code, e.g., a general factory installed unit-ID code. Having the base-station gives the added utility and functionality to 'customize' the system. A few examples of such added utility, is the ability to customize the 'names' of rooms (instead of just the generic Room-1, Room-2, etc.), or to make hands-free incoming and outgoing phone calls (as will be fully detailed later), etc. The inventors have detailed an identifying protocol (unit-ID code 66) to communicate between each other fully automatic.

But it is explicitly understood that other protocols, and particularly the BACnet (Building Automation and Control Network) standard, as one that would also work well. Further, the inventors know that mobile phone APPs (applications), could duplicate the workings of the base station, and therefore some may feel it unnecessary. Also, devices such as Amazon Corporation's Alexa/Echo system, or Google's Home system, etc., could replicate the function of the base-station and the inventors would welcome such collaboration. But the base-station acts like a convenience device nucleus to the modern home and therefore exemplary to the present invention.

There can be as many base-stations BS within the network as desired, all sharing the same information and registry information via unit unit-ID code 66. For example, a base station for each floor of a dwelling/home might be; one in the basement, one on the first floor and one on second floor. Or, base stations could be statically located in main areas, such as the kitchen, family room and master bedroom, where occupants gather most and are the cross-paths of activity.

Figure 7:
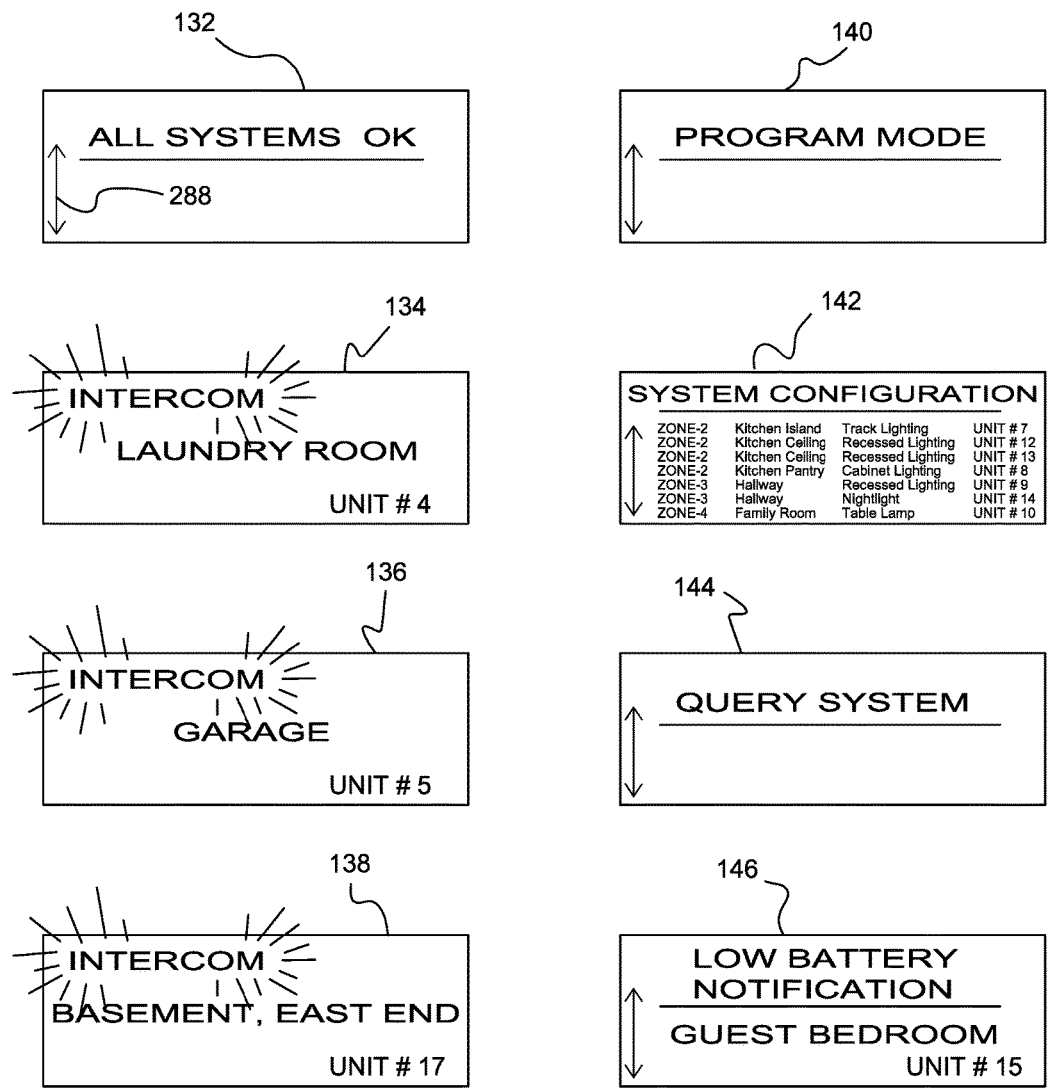
FIG. 7 are examples of various screens, menus and displays of the base-station of the present invention of FIG. 6, in accordance with an embodiment of the present invention.
Figure 8:
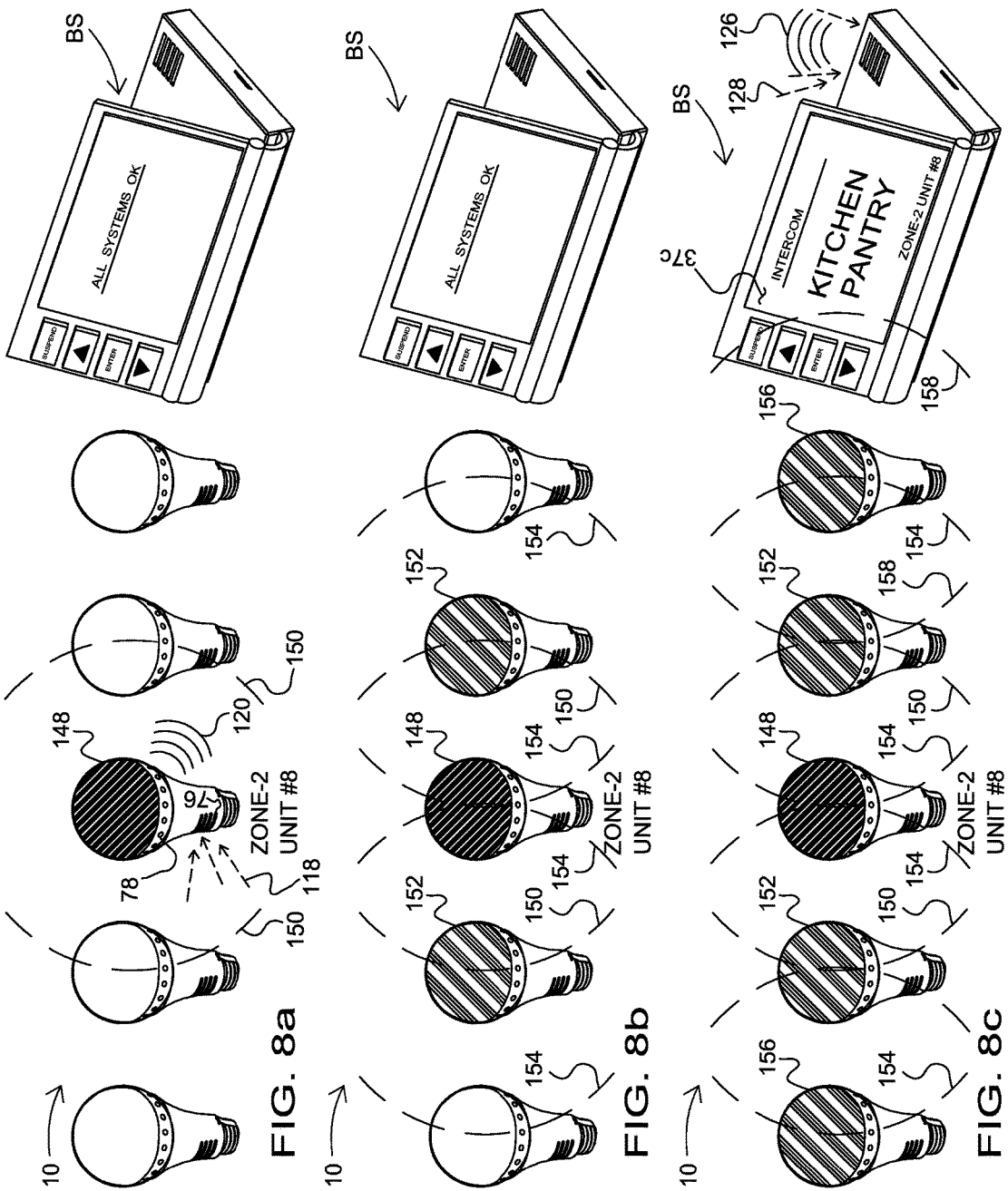
FIG. 8a is an illustration of the present invention networking, where a single of a light/intercom system unit initiates an intercom active query.
FIG. 8b is an illustration of the present invention networking, where the close in-range units receive and repeat transmits the intercom query of first said light/intercom system unit.
FIG. 8c is an illustration of the present invention networking, where the close second in-range of a light/intercom system units receive and repeat transmits the intercom query of first said unit, and, is received by the base station.

Moving to FIG. 7, there are examples of various screens, menus and displays of the base station of the present invention of FIG. 6, in accordance with an embodiment of the present invention. An 'All Systems OK' 132 menu is the default screen when every unit in the network is functioning normal an in a standby mode. There are three examples of intercom uses menus 134, 136 and 138; showing activity and, the unit's location and unit number. Menu 140 is a 'Program Mode', showing the base-station BS ready to identify a NEW light/intercom system 10 being introduced to the network (functionality will be further disclosed later). A Menu 142 'System Configuration' process assigning individual light/intercom systems 10 to their location with a structure. A Menu 144 'Query System' affords a full system test of a network of units (aiding in the setup of the network in home or structure, including volume settings). And a Menu 146 'Low Battery Notification' identifies an individual unit LED light/intercom system 10 not functioning correctly, and its location.

FIG. 8a is an illustration of the present invention networking, where a single light/intercom system 10 unit intercom being initiated 148; by listen for voice 118 arrows. The speech (represented by the 118 arrows) is transmitted via RF signal range 150, of unit intercom being initiated 148, and reaches nearby network light/intercom system 10 units.

FIG. 8b is an illustration of the present invention networking, shows the close in-range units ($1^{st}$ repeat comm signal 152), receives and repeat transmits the intercom query of first said unit (148's speech message), as represented by 1st repeat unit transmit range 154.

FIG. 8c is an illustration of the present invention networking, where the close second in-range units (2nd repeat comm signal 156), receives and repeat transmits the intercom query of first said unit (148's speech message via the 1st repeat comm signal 152), as represented by 2nd repeat unit transmit range 158. FIG. 8c further shows that the base-station BS is within the second unit (2nd repeat unit transmit range 158) and, it receives the 148's speech message; as represented by the base-station BS broadcast speech 120. The base-station BS displays the location of the imitating intercom 148 unit. In like manner, to respond back with a speech message from the base-station, a voice message is heard via the listen for voice 128; by the base station. The FIGS. 8a, 8b & 8c show the 'handshaking' characteristic of the light/intercom system 10; both between the light/intercom system 10 units and the base-station BS.

It is important to understand, that this networking of 'receiving and repeat transmitting' message signals, can cover large areas within a structure, and not have to have the signal strength of any given unit to reach the furthest ends of the network, e.g., having a low power RF capability for each individual unit. Of course, it is obvious that an improved LED light/intercom system 10 unit would have to be within range of one another; such as would be with a unit in each room of a structure, like a house. The range in the preferred embodiment of a light/intercom system 10, is thirty to fifty feet; small enough to conserve power but big enough for signals to reach from-room-to-room in typical structures. The transfer 'repeat' signal (via the unit-ID code protocol), easily facilitates larger homes without have to transmit signals to the furthest points, but rely on a hand-shaking transfer of signals.

Figure 9:
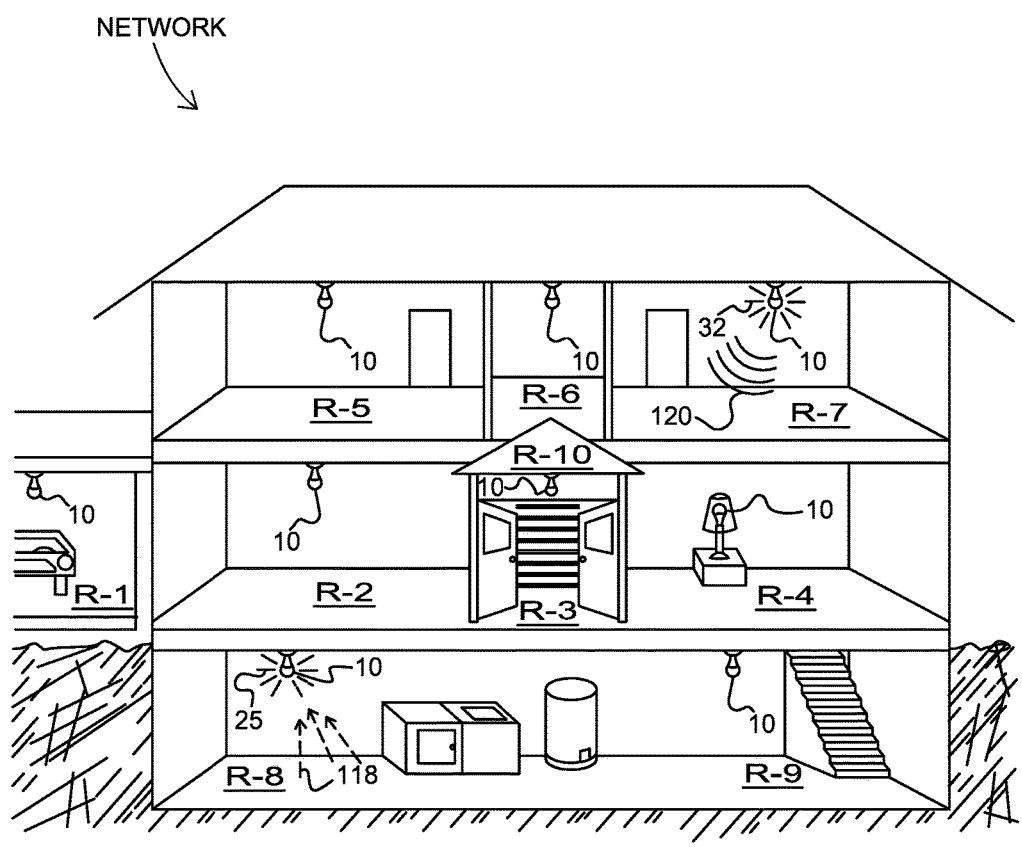
FIG. 9 is another illustration on the present patent of a light/intercom system networking in a typical home application, in accordance with an embodiment of the present invention.

In FIG. 9 is another illustration on the present patent networking in a typical home application, in accordance with an embodiment of the present invention, where an improved LED light/intercom system 10 is in various locations of a structure "the NETWORK"; creating a network. The locations are indicated as R-1 through R-10 (in the FIG. 9), with a LED light/intercom system 10 in each room. The rooms can be identified as numbers or by name, such as laundry (R-8), kid's bedroom (R-7), for example. The figure shows R-8 receiving listen for voice command 118 via the microphone 25 (in light/intercom system 10), and, the unit in R-7 is broadcast speech 120 via speaker 32 (as referenced in FIGS. 1 and 8a).

The message generated and sent from the unit in R-8 to the unit in R-7 was through the T/R transmit/receive signal handed to all units within range of the unit in R-8 laundry area. In this case, said message transfer would be through the unit in the R-9 (1st repeat unit), then R-4 (2nd repeat unit) before being broadcasted in the target room R-7, light/intercom system 10. Of course, the path indicated is only an example. The message could have transferred via R-2, then R-5, R-6 and finally to R-7 unit. But the R-7 unit would have already had the message (which was identified as being already executed) and therefore ignored. Exactly how the intercom operations and executed will be more detailed later. As will be the intercom commands.

Figure 10:
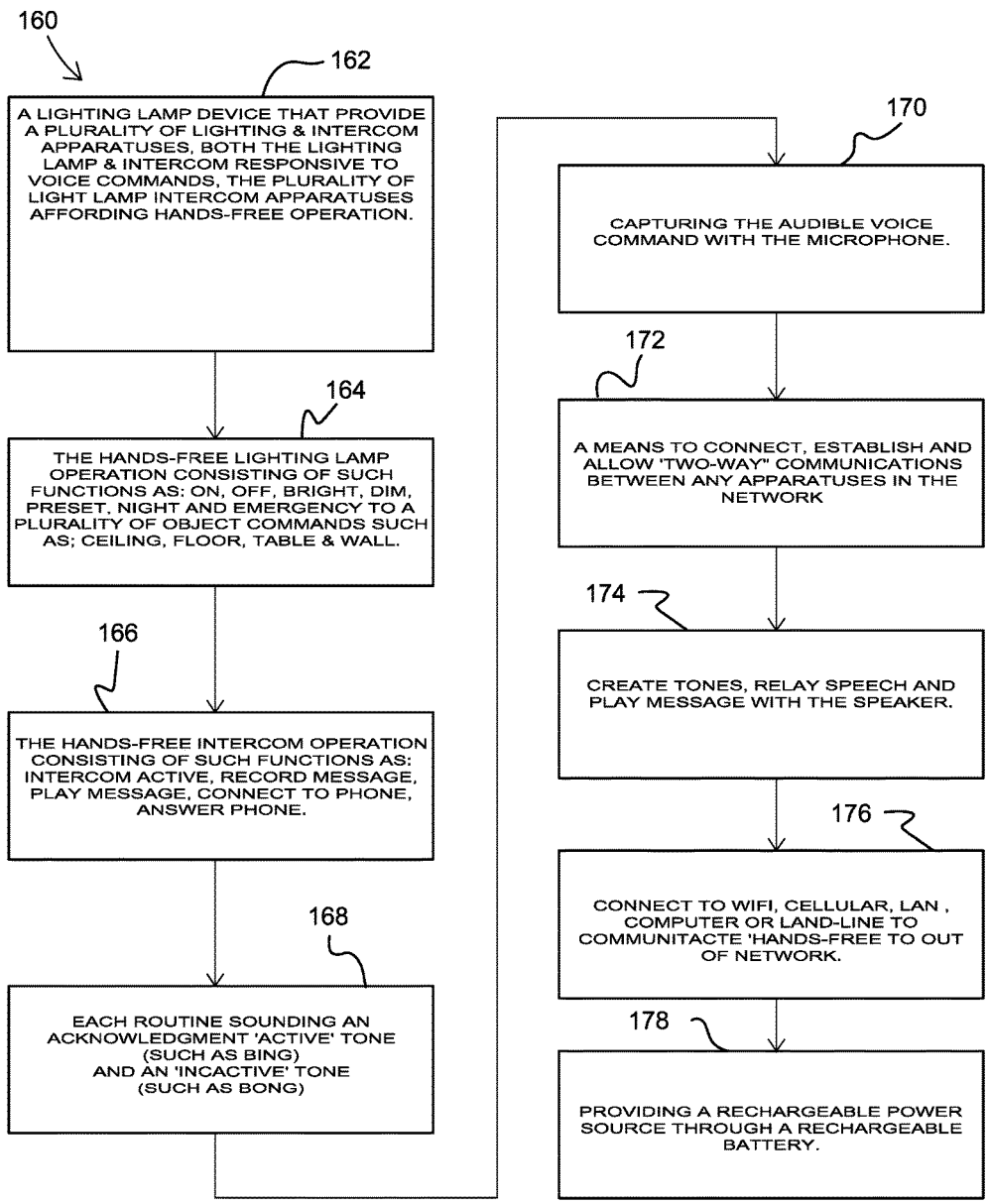
FIG. 10 is a diagram of sequence showing an exemplary method of voice commands and control of a light/intercom system, that are recognizable to the system and its operations, in accordance with an embodiment of the present invention.

FIG. 10 is a diagram of sequence 160, showing an exemplary method of voice commands and control, that are recognizable to the system and network of FIG. 9; showing its operations, in accordance with an embodiment of the present invention with each block 162 through block 178 listing the routines that each improved LED light/intercom system 10, and, base-station BS could execute.

Figure 11:
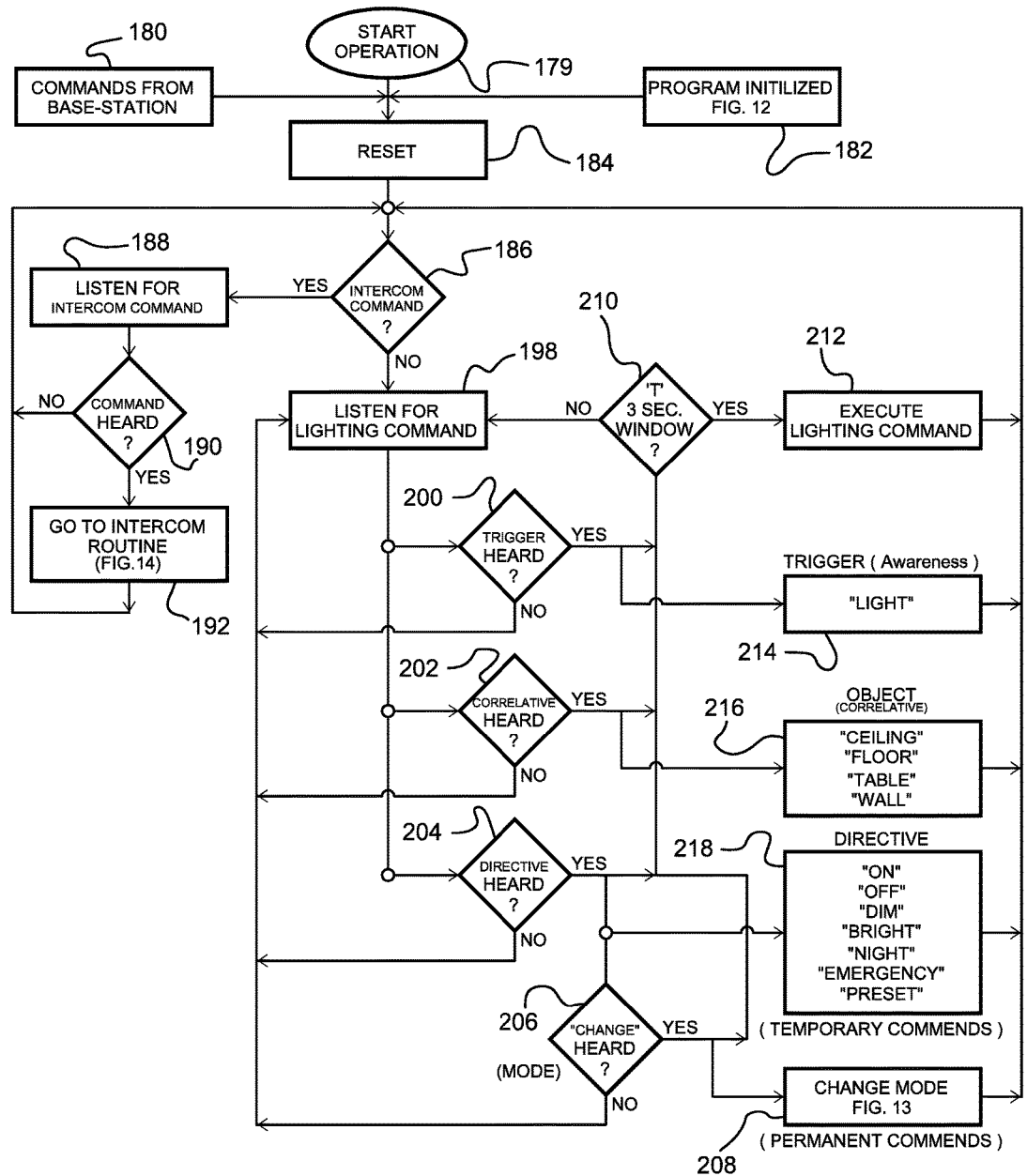
FIG. 11 is a flow-chart detailing the OPERATIONS process of a light/intercom system for voice control of lighting and intercom commands, in accordance with an embodiment of the present invention.

FIG. 11 is a flow-chart detailing the OPERATIONS process for voice control of the lighting and intercom commands of a light/intercom system 10, in accordance with an embodiment of the present invention. Once the system becomes 'alive', as described in the previous paragraph (by activating the battery 20), the process starts at oval 179. A command from base station 180 process, or, a program initiation 182 process are always ready to input the start operations 179. The processes 180 and 182 will be more detailed later. The operations start with a reset 184 process, and then checks for an intercom command-? 186.

If an intercom command 186 is true, exists with a 'YES', the system would activate and then listen for 'intercom command' 188 word processes. If a no silence at the command heard-? 190, the 'NO' process cycles back to intercom command-? 186 state. If a command heard-? 190 is 'YES', the go to intercom routine 192 (see FIG. 14).

Returning now to the intercom command-? 186, in the case of a 'NO' is determined. The process would advance to listen for lighting command 198. The process 198 would now listen for three possible lighting command fields, a trigger heard 200, a correlative heard 202, or a directive heard 204. The voice recognition library in memory is limited to under thirty 'word' lighting and intercom basic commands. They are listed in the word-table by fields below as the preferred embodiment of voice commands:

| VOCABULARY LIGHTING & INTERCOM WORD TABLE: | | | |
|---|---|---|---|
| OTHER | TRIGGER | CORRELATIVE | DIRECTIVE |
| | INTERCOM | ACTIVE | ALL |
| | | ON | RECORD |
| | | CANCEL | PLAY |
| | | END | PHONE |
| | | | ANSWER |
| | | | CALL |
| | | | CANCEL |
| | LIGHT | CEILING | ON |
| | | FLOOR | OFF |
| | | TABLE | DIM |
| | | WALL | BRIGHT |
| | | | NIGHT |
| | | | EMERGENCY |
| | | | PRESET |
| CHANGE | | | AUTO |
| | | | TIMER |
| | | | RESET |
| | | | TEST |

There vocabulary of word voice commands (listed in the Vocabulary Word Table), can be further 'learned' by the base-station BS when incorporated into the network. The learned (representation of the commands) resolve any speech inflection issues that are unique to an owner of the system, and, are recorded to memory. This will be more fully discussed later.

In the case of trigger heard-? 200 is "YES", only one word is acceptable: LIGHT 214. The process would start timer 'T' 3-sec. 210 for three seconds. The other two fields (correlative heard-? 202 and directive heard-? 204) must be accomplished with the 'T' 3-sec. 210 window of time, and, if "YES', the command is executed in execute lighting command 212 process. If the full three-part command is not accomplished within the timing window 'T' 3-sec. 210, the process reverts back to listen for lighting command 198 via the 'NO' process.

It is significant to note that the commands establish a unique pattern of dialogue, with the light/intercom system 10, having three elements; 1) an awareness/trigger (prompt)

part, 2) a correlative (object) part, and 3) a directive (instruction) part. An example for a lighting command could be "light-table-dim" spoken in any combination ("dim-table-light," or "table-dim-light", etc.). Meaning, the 'light(s)' (awareness/trigger) on the 'table' (correlative/object) in a room full of different lights such as ceiling, floor, wall, etc., and, go to 'dimmer' setting (directive/instruction). An example for an intercom command could be "intercom-active-all."

It is further significant that all lighting lamp styles and shapes (as is disclosed earlier in this document and specifically the H-A, H-B, H-C, H-D, and H-E configurations) all 'fit' into one of the four, easy to understand, correlatives; ceiling, floor, table and wall. One example of this simplification is the "nightlight" (H-E configuration) would be identified as a wall unit. Similarly, an oil painting on a wall, lit either from a focused track light, recessed canister light from the ceiling, or wall sconce light, could all be identified as a 'wall' light, as the object, to the preference of the user of the present invention of a light/intercom system 10. The identifying process of individual units, will be disclosed in FIG. 12.

Returning back now to finish the FIG. 11 flow chart, the correlative heard-? 202 will respond 'YES' to only one of the four words in a correlative 216 field (ceiling, floor, table or wall). Likewise, the directive heard-? 204 is 'YES' to only one of the seven words in a directive 218 field (on, off, dim, bright, night, emergency or preset). The command responses for 216 and 218 will be further discussed below. If the directive change (mode) heard-? 206 is "YES", the process enters the change mode 208 process. The change mode will setup the basic operation of the device to one of three possible scenarios; AUTO mode, TIMER mode, or NO mode (that will be disclosed in FIG. 13).

Figure 12:
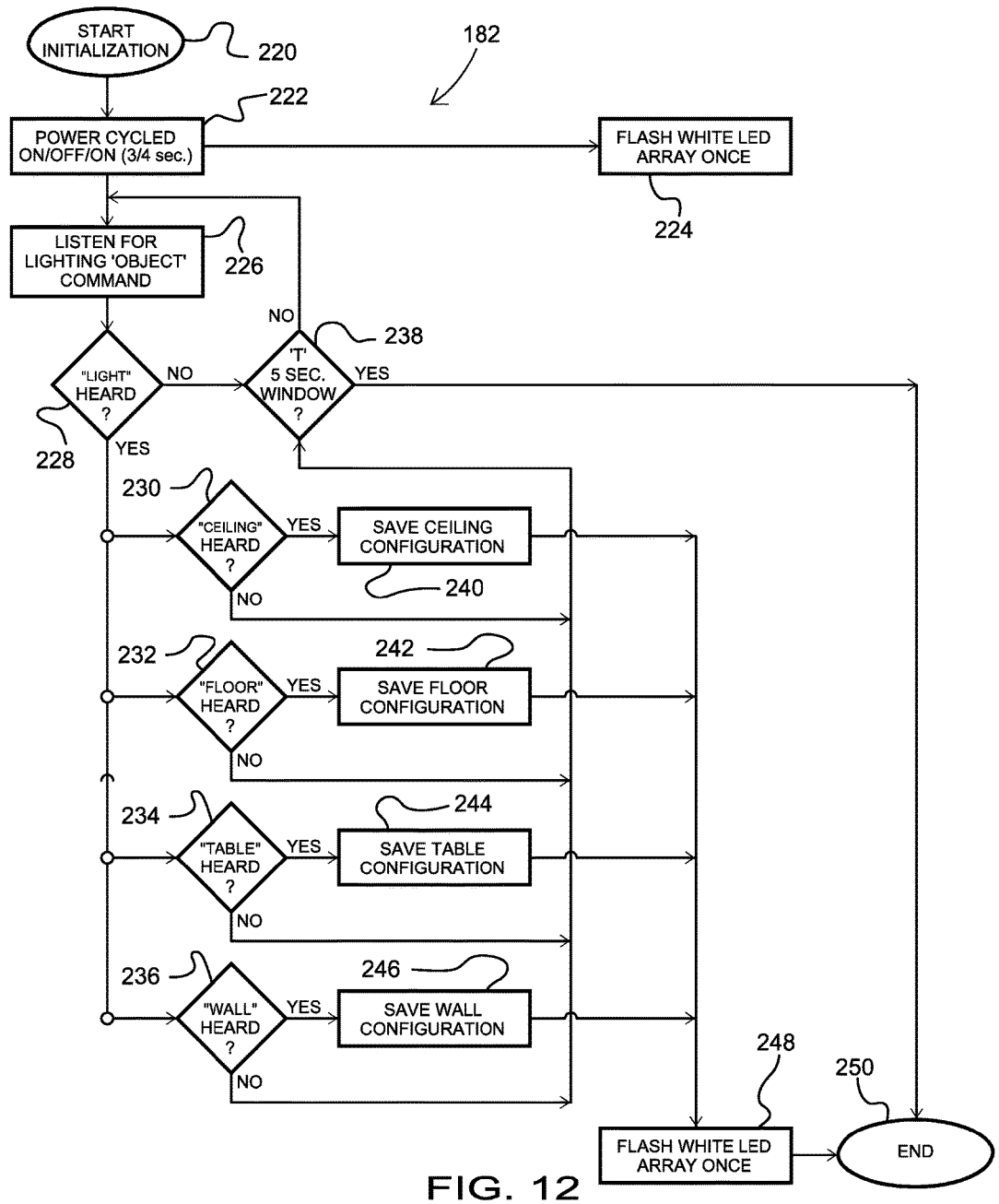
FIG. 12 is a flow-chart of the program INITIALIZATION process of FIG. 11, in accordance with an embodiment of the present invention.

FIG. 12 is a flow-chart of the program INITIALIZATION process of FIG. 11, of a light/intercom system 10 in accordance with an embodiment of the present invention. A start initialization 220 oval can be entered automatically upon the system first coming alive (battery inserted and unit assembled, 'snapped-together,' as was discussed earlier), or, upon commands from a base station in program mode. Or manually, via a power cycled 222 process (of the light fixture's switch being turned ON, then OFF, then back ON, within a short period of time, such as ¾ of one second, for example).

A flash white LED array once 224 process (white LED strobing array 24 in FIG. 1) will occur if successful ON/OFF/ON engagement of processed, to let the user know the unit is now in the initialization program mode. A listen for lighting object command 226 process is entered, and if "LIGHT" heard-? 228 is successful (YES), the correlative object will next define the unit's identity; a "CEILING" heard-? 230, a "FLOOR" heard-? 232, a "TABLE" heard-? 234, or a "WALL" heard-? 236.

If any 'one' (that is, the first successful one), of these four objects is successful with the YES response, the process will enter; a save ceiling configuration 240, a save floor configuration 242, a save table configuration 244, or a save wall configuration 246 respectively. Upon any one of these executions (230, 232, 234 or 236) will save the unit's identity respectively and all future operations will respond only to such identity indicated in (240, 242, 244 or 246); until or when that particular unit is re-programed to a different identity. After the identity process is saved, a flash white LED array once 248 process will occur (via white LED strobing array 24 of FIG. 1). And, the initialization program 220 is exited at the end 250 process; and returning back to operation routine in FIG. 11.

Referring back to the "LIGHT" heard-? 228, if process is 'NO', a "T" 5-sec. window 238 timer is started. During the 5 second time period, the process will revert back to the listen for lighting command 226 until a proper command is heard, or, will exit via the 'YES' upon completion of the time period, to the end 250 routine. Likewise, if any of the objects 230, 232, 234, or, 236, is a 'NO' (that is NOT heard properly such as in a muddled speech command), the 'NO' process would return to the 'T' 5-sec. window 238; and either revert back to listen again or exit depending on any time remaining in the window.

Figure 13:
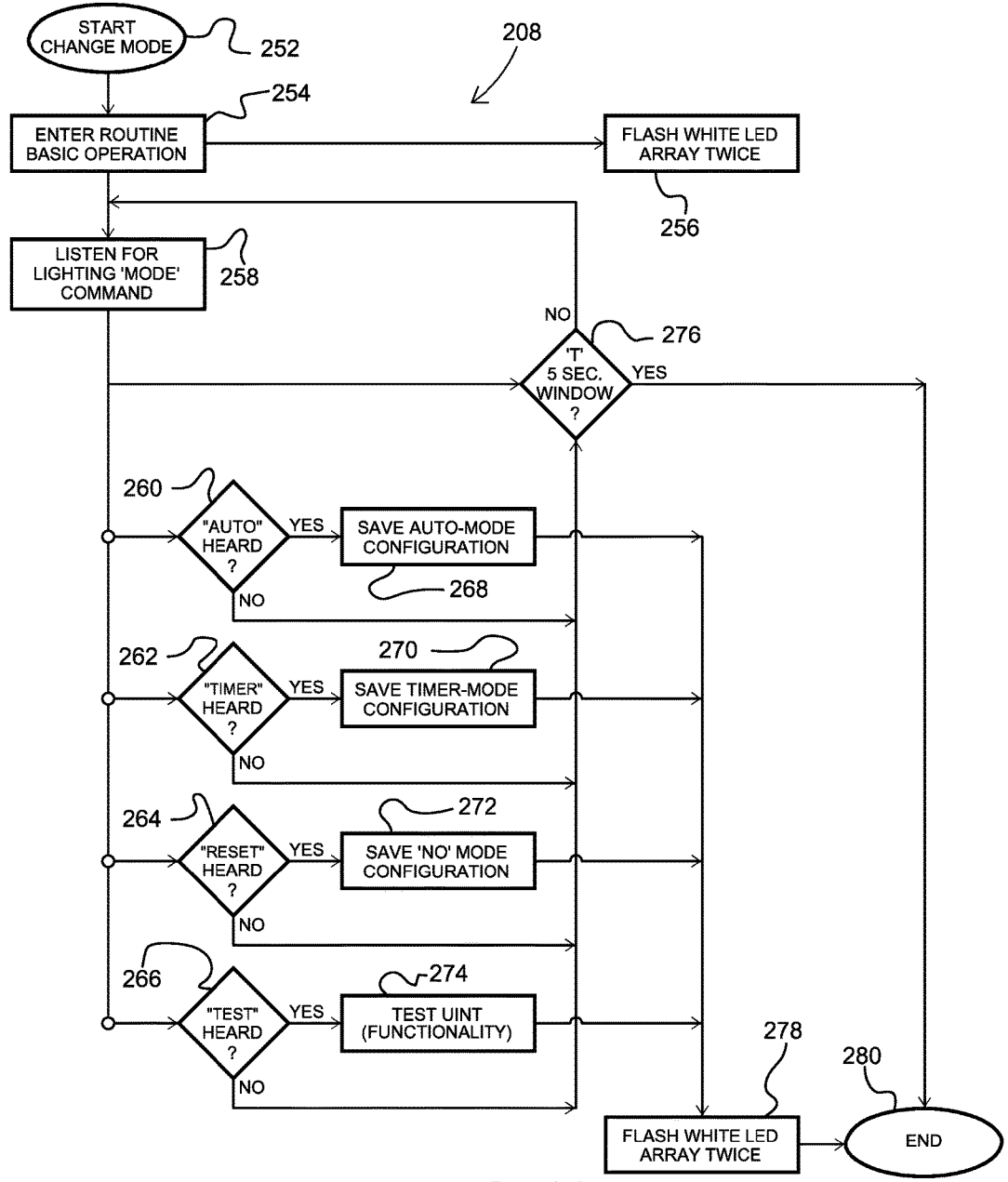
FIG. 13 is a flow-chart of the program CHANGE MODE process of FIG. 11, in accordance with an embodiment of the present invention.

FIG. 13 is a flow-chart of the program CHANGE MODE process of FIG. 11, of a light/intercom system 10 in accordance with an embodiment of the present invention. The change mode 208 is a permanent change of the behavior of the light/intercom system 10, to either an auto mode or a timer mode behavior. If neither auto or timer modes, then it would be no or none/null, mode selected (the modes of operation will be detailed later in this disclosure). The routine is entered at a start change mode 252 oval. This is a basic operation 254 process (as was just explained above). A flash white LED array twice 256 process occurs (by the white LED strobing array 24 in FIG. 1), letting the user know the light/intercom system 10, is in a program mode to change basic operation 254 behavior. The listen for lighting mode command 258 process will now be attentive for an "AUTO" heard-? 260, a "TIMER" heard-? 262, or a "RESET" heard-? 264 commands, and start a 'T' 5-sec. window 276 timer.

Upon any one of these executions (260, 262 or 264) with a 'YES', will save the unit's basic operation function respectively, to a save auto-mode configuration 268, a save timer-mode configuration 270, or a save 'no' mode configuration 272, and, all future basic operation functionality will respond only to such mode selected (260, 262 or 264); until or when the unit is re-programed to a different basic routine function by re-entering start change-mode 252 process. After the change-mode process is successfully saved, a flash white LED array twice 278 process will occur (via the white LED strobing array 24 in FIG. 1), letting the user know that the mode successfully was changed and permanently saved. And, the change-mode program 208 is exited at the end 280 process; and returning back to operation routine in FIG. 11.

Referring back to the "AUTO" heard-? 260, or the "TIMER" heard-? 262, or the "RESET" heard-? 264 commands that are NOT heard (such as would be if the voice command is not properly spoken as in a muddled speech command or noise in the background), the process is 'NO', and the "T" 5-sec. window 276 timer is entered. During the 5 second time period, the process will revert back to the listen for lighting mode command 258 until a proper command is heard, or, will exit via the 'YES' upon completion of the time period, directly to end 280. This would be an unsuccessful attempt to change modes and no action was taken; the user could retry to enter the change-mode 208 routine if desired to change mode again.

Finally, if a command to "TEST" heard-? 266 is 'YES' would cause a unit enter test unit 274 process. The test 274 process would illuminate all 'like' identified light/intercom system 10 units in the network. For example, all ceiling hallway lights in a string that was paired with one another to operate with a single command (the pairing is a base-station function). The 'test' feature also is integral to the setup of the light/intercom system 10, during its first initialization; wherein there is a means to set the volume for that individual light/intercom system 10 unit. For example, within the 'test' unit 274 process, the light/intercom system 10 would be attentive to "INCREASE" or "DECREASE" until the word "END" is heard. Whereupon, the level of volume would be saved in memory, and, that individual light/intercom system 10 would always give speech at the desired level of volume.

A brief explanation of each mode is as follows: The CHANGE mode feature, will set the light/intercom system 10 lighting to behave in any of four routines. The AUTO mode configuration would illuminate any given unit, to ON or OFF when activity is sensed in the area. For example, a user walking in a room or hallway, and the lights automatically turn on, and off again when the user leave the area. The sensing can be of two different processes, 1) by listening to sounds and reacting, or 2) by a motion detector (not shown in any figures).

The TIMER mode configuration would turn lights on or to a preset level, at a sliding time period for an interval of time. This is accomplished by showing the unit when to activate (either on/dim setting and off), if the TIMER feature was commanded at said time period, the unit would behave in like manner, to a 'sliding schedule' there forward.

Again for example, commanding a light/intercom system 10 on to a preset of 80% at 6:00 pm and then off at 10:00 pm (if TIMER was initiated at both commands), the system would automatically turn on to 80% and off at a daily regular schedule. However, the timer schedule would be with-in a sliding range plus or minus one half hour for each event. The system does not have a so-called time-of-day chock internal to it, it simply just counts hours and thereby would repeat the timer schedule to a pseudo twenty-four-hour interval (+/− to the ongoing sliding range). The timer mode is particularly useful if the user is not home, and would give the illusion that the user is at home and doing the lighting manually.

The RESET mode feature, will deactivate either the auto or timer modes and will put the light/intercom system 10 to none (or 'no'/'null' mode), where upon the unit now behaves with just the regular ON, OFF, DIM, BRIGHT, NIGHT, EMERGENCY or PRESET commands only.

Before continuing a discussion of each lighting commands is as follows: With respect to the directives ON and OFF, the light/intercom system 10 would turn the white LED main array 22 (and 24) to either full on or off as the case may be. With the voice commands DIM or BRIGHT, the light/intercom system 10 wound decrease or increase light intensity of the said LED's, for example, 20% for dim and 10% for bright, per command as the case may be. The command NIGHT, would set all networked light/intercom system 10 units to a predetermined state of illumination; as desired by the user. Some units may be full on and others full off, and still other at some level of brightness. The user would identify the statue of each individual unit (object), to the NIGHT directive as desired as well. When the NIGHT is commanded, either any given individual unit voice command or via all units with the base-station BS control-center command. This is particular useful to the user when retiring for the evening; to simply command the NIGHT directive and all lights go to their designated detail task of illumination.

Similarly, the EMERGENCY command directive, would illuminate all desired networked light/intercom systems 10 to come to action in a two-capacity feature. The first, for example, an unknown noise was heard in the middle of the night, the user could command EMERGENCY and all predetermined units would respond with illumination, flashing, full ON & OFF repeatedly (giving a 'panic' sense of importance). In the second case, the EMERGENCY command will allow illuminate during 120/240 VAC line power outages, using just a 20% illumination (giving enough light to sufficiently see surroundings). Thus, extending the time the battery can give emergency lighting of the light/intercom system 10. The PRESET feature is a mood environment level of light that was a desirable set-up and saved. For example, commanding a unit to a DIM setting, say down to just 40% (i.e., three 20% dim directives), and, then using the preset to save the desired setting for future commands. The unit would go directly to the preset level of intensity when commanded in future use be verbally commanding PRESET as the directive. To summarize, each 'directive' command is defined as follows:

ON=system LED illumination too full 'on',
OFF=system full off,
DIM=if system is 'off, illuminate to 80%, if system is 'on' decrease illumination by 20% for each DIM command,
BRIGHT=increase illumination by 10% for the first-of commands, then by 20% for each additional BRIGHT command,
NIGHT=system to go-to predetermined setting (ON, OFF or DIM),
PRESET=system to go-to predetermined setting (ON or DIM),
EMERGENCY=system LED illumination too full 'on-flashing' if 120/230 VAC line power is available, else use 20% illumination for battery operation.

Figure 14:
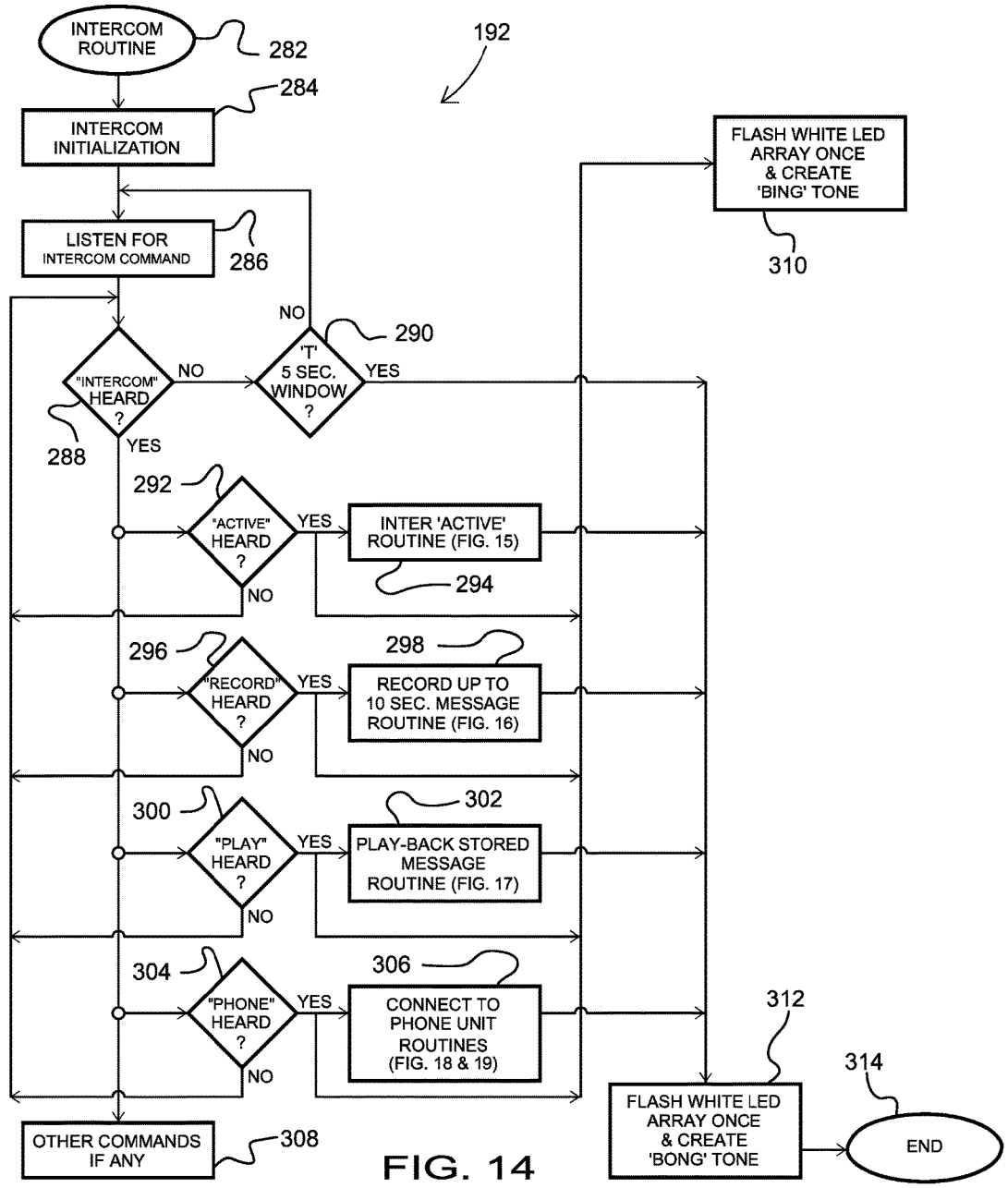
FIG. 14 is a flow-chart detailing the INTERCOM ROUTINES process for voice control of intercom commands, in accordance with an embodiment of the present invention.

FIG. 14 is a flow-chart detailing the INTERCOM ROUTINES 192 process for voice control of intercom commands, of a light/intercom system 10 in accordance with an embodiment of the present invention. The oval 282 starts and intercom initialize 284. The listen for intercom command 286 is entered. If "INTERCOM" heard-? 288 is detected, the 'YES' would be attentive for possible commands: "ACTIVE" heard-? 292, "RECORD" heard-? 296, "PLAY" heard-? 300, and "PHONE" heard-? 304 or other commands 308. If the command was 'YES' for any of these, the flash white LED & create 'bing' tone 310, and, would enter 'active' routine 294, 'record' routine 298, 'play-back' routine 302, 'connect' to phone routine 306 respectively, (that is, follow the routines in their flow charts in FIGS. 15, 16, 17 and 18 & 19 respectively). When the go-to routine 192 is complete, the process goes to flash white LED & create 'bong' tone 312 to end the intercom routine 314 and return to main operating routine in FIG. 11. The details are more refined in FIGS. 15 through 19 for the functions listed in FIG. 14.

Figure 15:
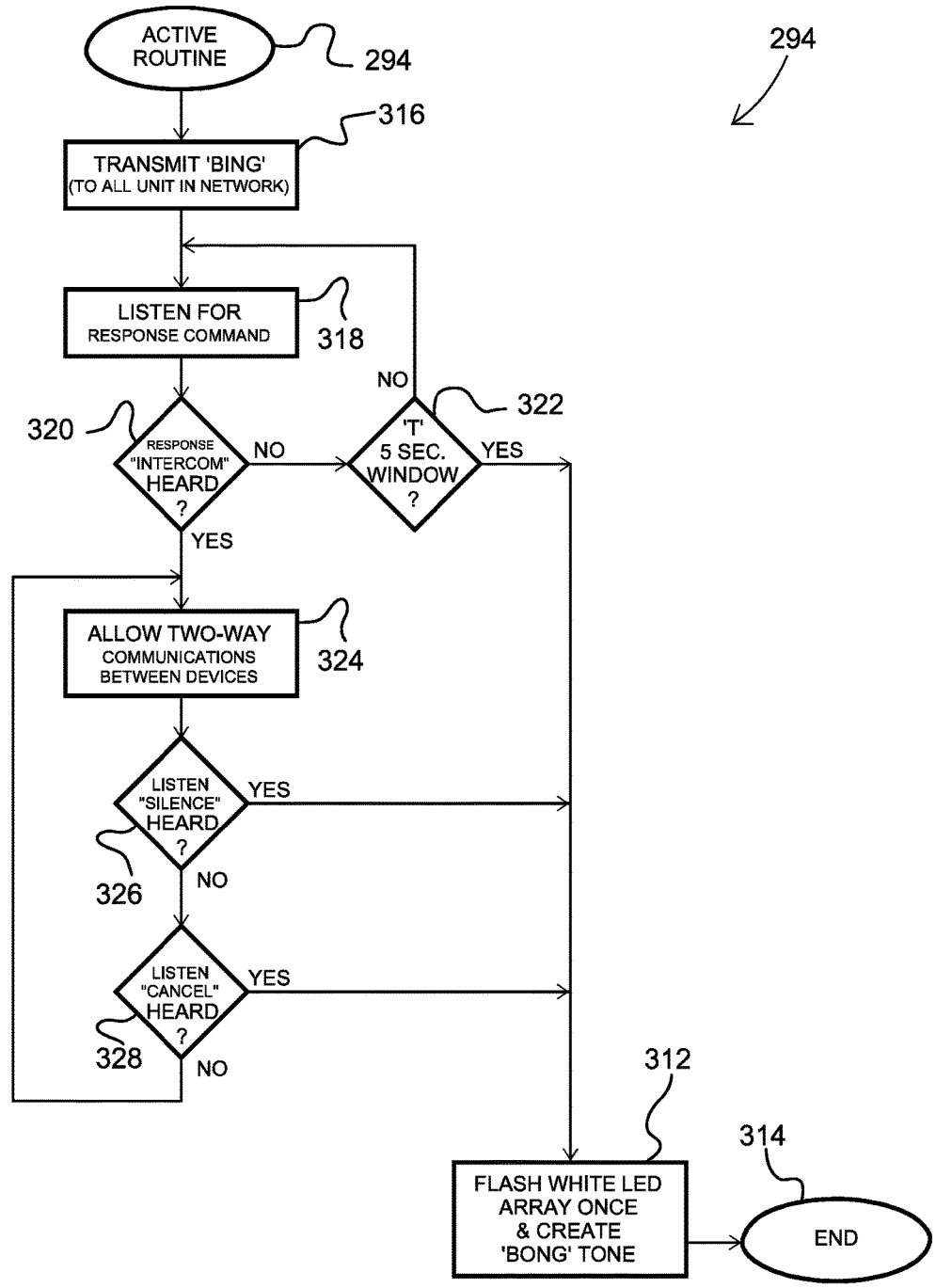
FIG. 15 is a flow-chart of the program INTERCOM ACTIVE process of FIG. 14, in accordance with an embodiment of the present invention.

In FIG. 15 is a flow chart of the program INTERCOM ACTIVE 294 process of FIG. 14, of a light/intercom system in accordance with an embodiment of the present invention. Upon starting routine, a signal is transmitted at transmit 'bing' 316. Note, this can be to a select unit or all units in the network that will be more fully discussed later. The broadcast bing tone alerts others in the network that the intercom system is alive and gets attention for a verbal message/request to follow the bing tone. Following the message/request, the routine would enter listen for response command 318 (any person wishing to respond would activate the light/intercom system 10 at their location by reciting "INTERCOM ACTIVE" or "INTERCOM ON." This function is determined at "response intercom" heard-? 320 and would enter an allow two-way communication 324. A channel is opened between the two light/intercom system 10 devices, for speech exchanges (see FIG. 9 for an example showing R-8 initiating the action and R-7 responding). If the listen for "silence" is heard-? 326, is 'NO' then the listen for "cancel" heard-? 328 is entered; if also 'NO', the routine reverts back to allow two-way communication 324 and the conversation continues. Else a 'YES' at either 326 or 328 would result with the routine ending with a flash LED & create 'bong' tone 312 and end at 314. If a 'NO' response intercom heard-? 320 occurred, the routine would start the" 5-sec. timer" 322 window. Where if a 'NO' is true, the routine would revert back to the listen for response command 318 would cycle again; else a 'YES' would end the active-routine 294 through 312 & 314 as is indicated in FIG. 14.

Figure 16:
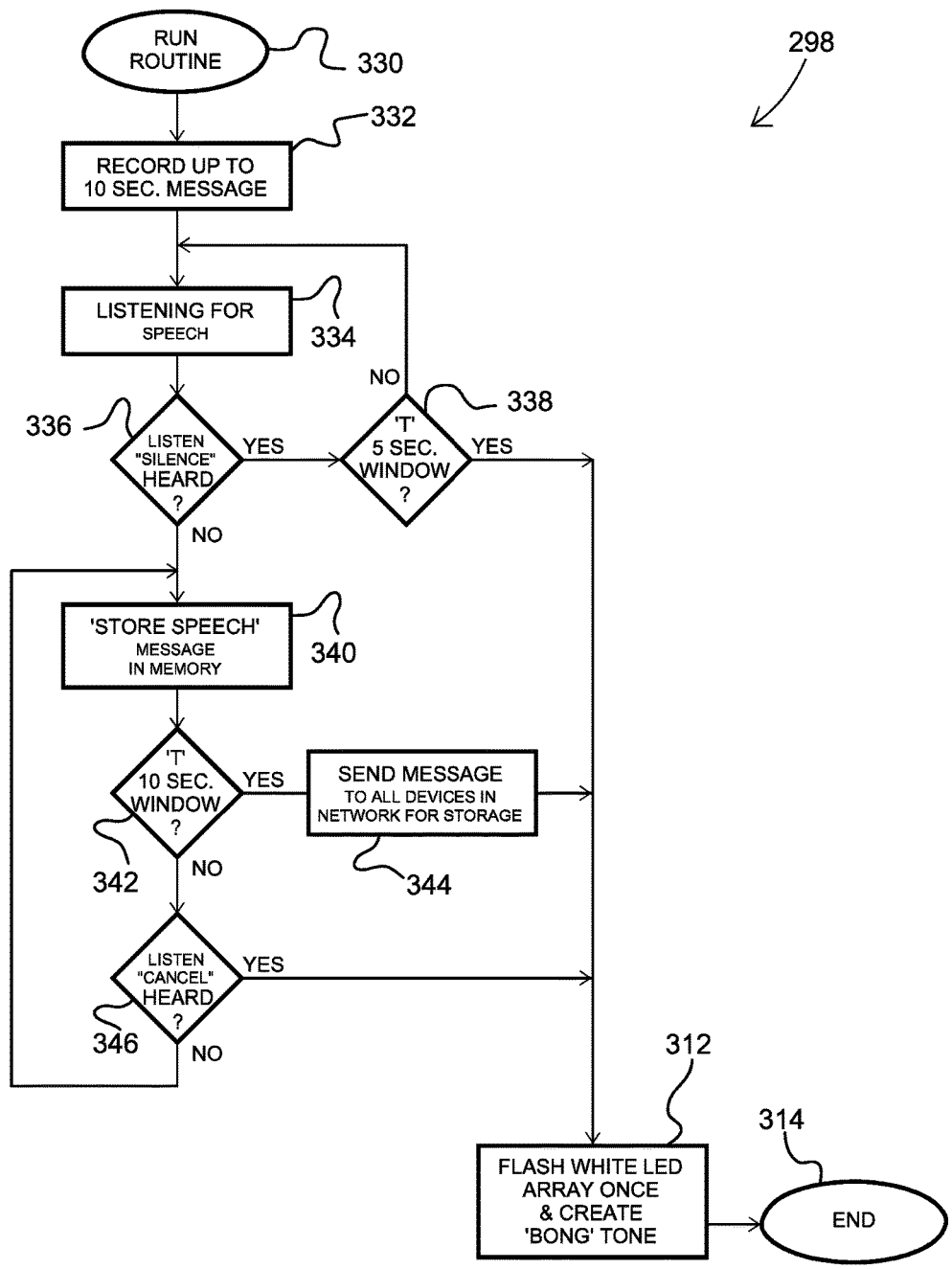
FIG. 16 is a flow-chart of the program RECORD MESSAGE process of FIG. 14, in accordance with an embodiment of the present invention.

FIG. 16 is a flow-chart of the program RECORD MESSAGE 298 process of FIG. 14, of a light/intercom system 10 in accordance with an embodiment of the present invention. Upon starting at run routine 330, with a 'bing' tone, a "record" up to 10 Sec. 332 process opens the system microphone 25, listening for speech is entered 334. The listen for 'silence' heard-? 336, if 'NO' is true, then any speech message present is stored at 'store speech' 340 in memory. As long as there is 'speech message' is heard, and, the timer 10 sec.-? 342 is 'NO', and, the 'cancel' heard-? 346 is 'NO', the process loops back to 'store speech' 340. When the timer 10 sec. 342 window reached zero seconds, a 'YES' is true; wherein the record process is terminated and the 'speech message' is sent via send message 344 to all devices in network for local storage (in all network light/intercom systems 10 via RF comm 36 circuit of FIG. 1). If at any time during the 10 second record period, a 'cancel' is heard at listen for 'cancel' heard-? 346, a "YES' is true and the record 298 process will end (as does when send message 344, is complete), and the unit will process a light flash and 'bong' at 312, followed with the end process at 314, as indicated in FIG. 14.

Returning to the listen for 'silence' heard-? 336, if nothing is heard, then a 'YES' is true, and a timer 5 sec. 338 will start. During the five second count-down of timer 338, the flow will revert back to the 'listening for speech' 334 and loop around until time is out. When a 'YES' is true for the time-out, after five seconds, the process will exit via 312 & 314 ending the record routine 298, as described above.

Figure 17:
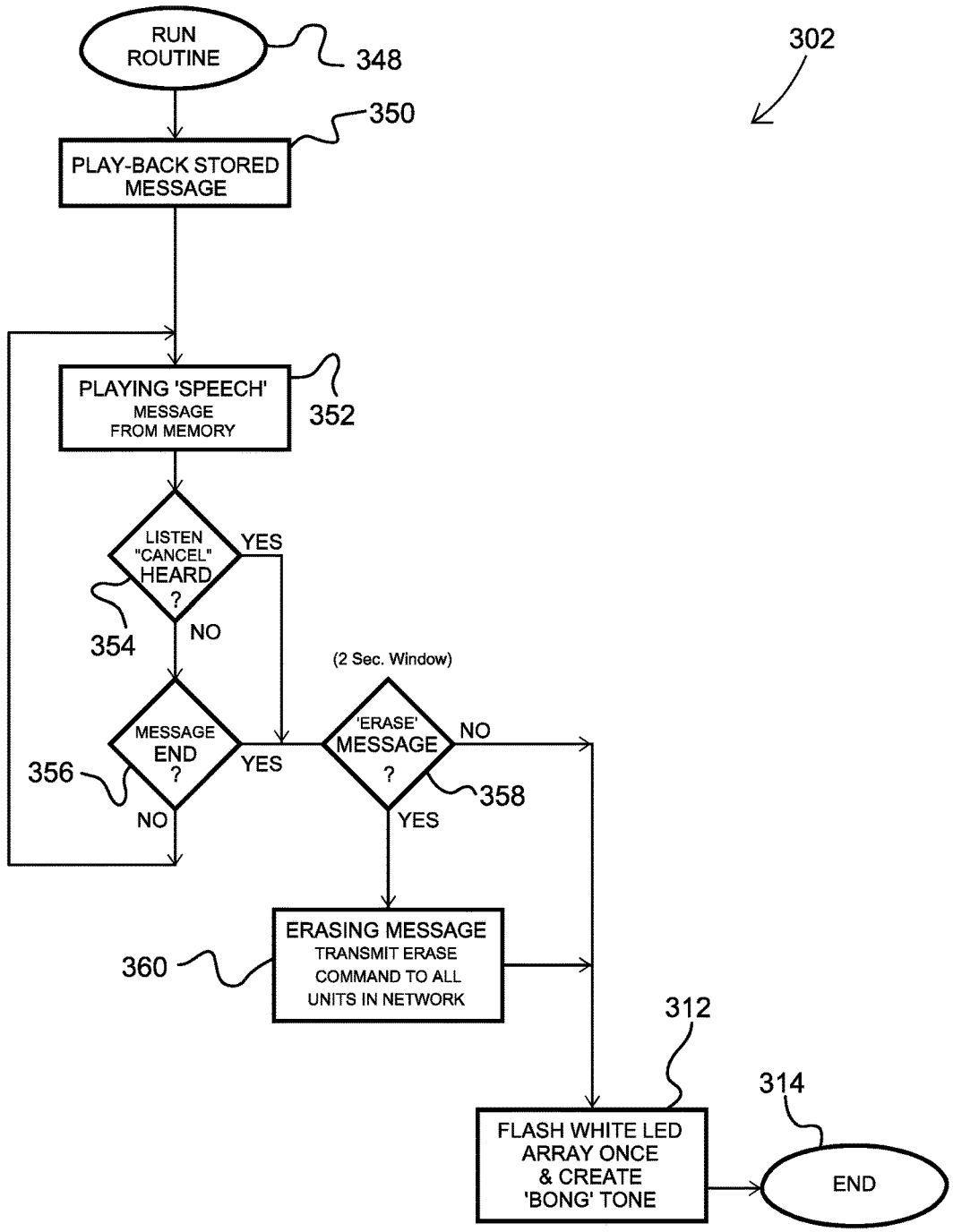
FIG. 17 is a flow-chart of the program PLAY-BACK MESSAGE process of FIG. 14, in accordance with an embodiment of the present invention.

FIG. 17 is a flow-chart of the program PLAY-BACK MESSAGE 302 process of FIG. 14, of a light/intercom system 10 in accordance with an embodiment of the present invention; whereby the run routine 348, with a 'bing' tone, will indicated the play message request is understood. The request retrieves the message (from memory 34 of FIG. 1) for playing from 'play-back message' 350 and 'playing speech' 352 begins (via activating amplifiers and speaker—also see FIG. 1). During the play-back message period, the system is attentive to listen for 'cancel' heard-? 354, or when 'message end' 356 is accomplished. If 'NO' for both of these is true, the system will loop back to 'playing speech' 352. Where upon, if either (354 or 356) 'YES' is true, the message will end. In this case, the process will advance to a two second window 'erase message' 358' option; where there is an opportunity to delete any recorded message. If 'NO' is true the process will end without erasing the message; if 'YES' is true, 'erasing message 360 is entered and the memory is cleared of any stored message, as well as transmitting a signal to all other devices in the network with the erase command. The play-back 302 routine will end via 312 & 314 as was earlier described in FIG. 14.

Figure 18:
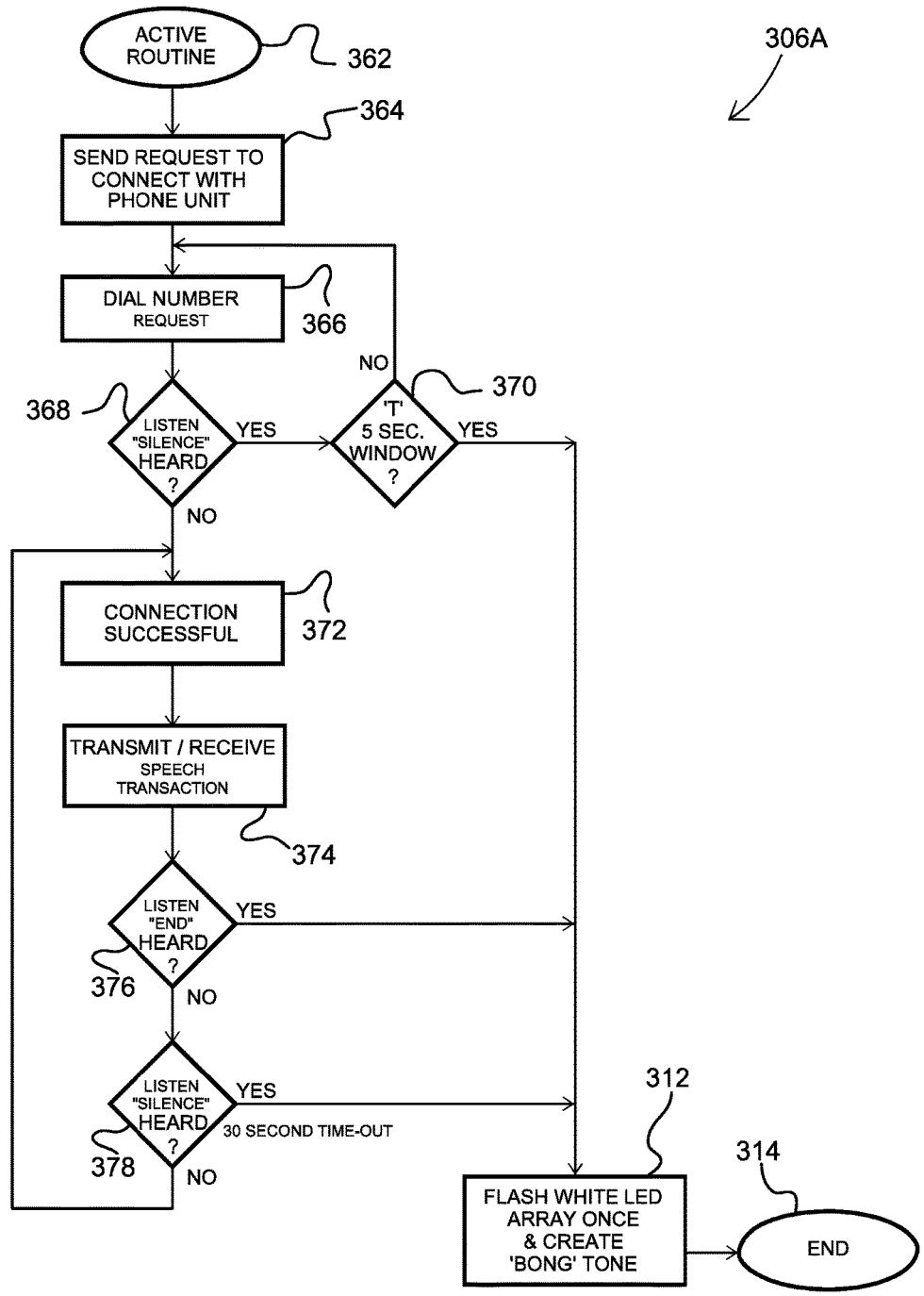
FIG. 18 is a flow-chart of the program SEND REQUEST TO CONNECT TO PHONE process of FIG. 14, in accordance with an embodiment of the present invention.

FIG. 18 is a flow-chart of the program (SEND REQUEST TO) CONNECT PHONE 306A process of FIG. 14, of a light/intercom system 10 in accordance with an embodiment of the present invention; whereby the run routine 362, with a 'bing' tone, will indicated that the request to connect with phone 364 is understood. The request will retrieve a stored number from memory or allow a number request via 'dial number 366 (note that the process 366 is not detailed to allow a clearer disclosure of the more important aspects of the routine). At the listen for 'silence' heard-? 368, if 'YES' is true would start timer 5 sec. 370 window. The routine would loop back to dial number request until number is complete, or, if the timer 370 runs out due to silence, and 'YES' is true, the routine would terminate via 312 & 314; reverting back to FIG. 14.

When the dial number request is complete (or the number is retrieved from memory), the process advances to connection successful 372; whereupon message-packets are sent and received via transmit/receive speech transaction 374. The process at transmit/receive speech transaction 374 continues as long as the conversation continues, or, one of the following occurs; 'end' heard-? 376 or 'silence' heard-? 378, 30 second time-out are 'YES' equals true. Whereupon the routine would terminate via 312 & 314 and revert back to FIG. 14. If 'NO' is true at 376 and 378, then the process loops back to connection successful 372, in a continuous loop.

It is explicitly understood that the SEND REQUEST TO CONNECT PHONE, routine disclosed in FIG. 18, can function as an 'emergency assistant.' That is, if a home was fitted with the improved LED light/intercom system 10 (as indicated in the 'NETWORK' shown in FIG. 9 and including the base-station of FIG. 6, or other compatible devices such as Amazon's Alexa or Google's Home for example), and an emergency happened; such as someone falling and perhaps not being able to get back up, or to safety, and, no one else is home, could call for help hands-free. Since the home is fully connected via a network of improved LED light/intercom system 10, in such a scenario, the individual that has fallen anywhere within the home, can simple verbally command "INTERCOM—PHONE" then "9-1-1" to get help. In a less dramatic scenario, the emergency call could be to a family member or neighbor. The point is, the present invention can function in a very practical way, in emergencies as an emergency assistant.

Figure 19:
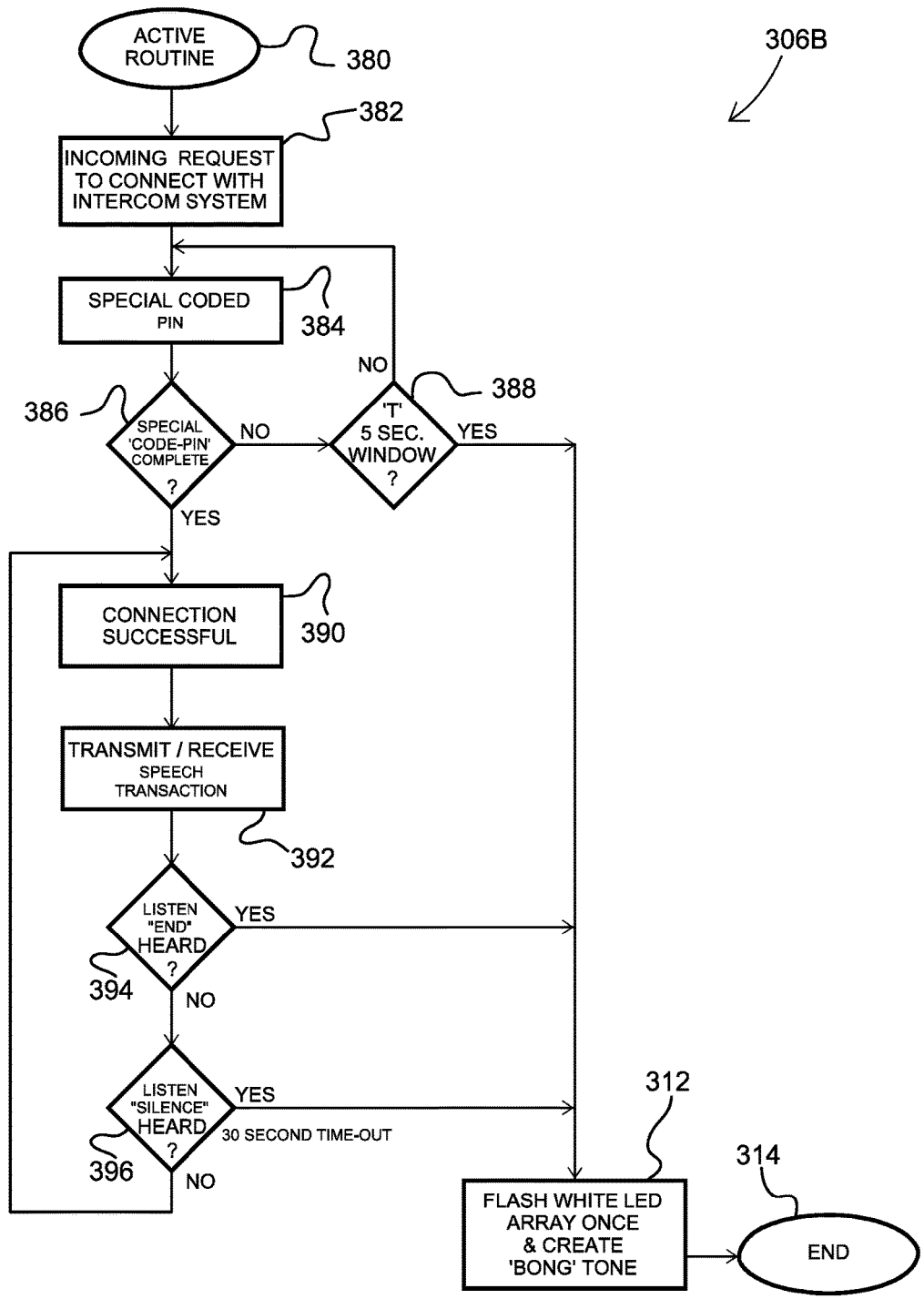
FIG. 19 is a flowchart of the program INCOMING REQUEST TO CONNECT WITH INTERCOM SYSTEM process of FIG. 14, in accordance with an embodiment of the present invention.

FIG. 19 is a flow-chart of the program (INCOMING REQUEST TO) CONNECT PHONE 306B WITH INTERCOM SYSTEM process of FIG. 14, of a light/intercom system 10 in accordance with an embodiment of the present invention; whereby the run routine 380, with a 'bing' tone, will indicated that the request to connect with phone 382 is understood. The process 'special coded-pin' 384 is entered. The inventers need to stress that the 'special coded-pin' number is an access code that is setup via a smart device (phone or computer) application that gives a secure means to access the improved LED light/intercom system 10 through phone communications. Because of the nature and intent of the use, of the present invention, the special coded-pin will give such security. More on this particular application, of this special coded-pin will be disclosed later.

At the 'special code-pin' complete-? 386, if 'NO' is true would start timer 5 sec. 388 window. The routine would loop back to 'special coded-pin' 384 number request until number is complete, or, if the timer 388 runs out due to silence, and 'YES' is true, the routine would terminate via 312 & 314; reverting back to FIG. 14.

When the 'special coded-pin' request is complete (386 is 'YES' true), the process advances to connection successful 390; whereupon message-packets are sent and received via transmit/receive speech transaction 392. The process at transmit/receive speech transaction 392 continues as long as the conversation continues, or, one of the following occurs; 'end' heard-? 394 or 'silence' heard-? 396, 30 second time-out are 'YES' equals true. Whereupon the routine would terminate via 312 & 314 and revert back to FIG. 14. If 'NO' is true at 394 and 396, then the process loops back to connection successful 390, in a continuous loop.

It is important to understand that the routines in FIGS. 18 and 19 allow hands-free operations of phone communications; through the improved LED light/intercom system 10 apparatus, located anywhere in the network. To initiate a call, one would simply direct his speech toward the apparatus of a light/intercom system 10, with verbal commands: "INTERCOM—ON—ANSWER." Each unit in the network would receive and re-transmit the command until the base-station (or other connecting device as was described earlier) receive and executes the command. After the number was established (as referenced in FIG. 18), the number would dial-out and communications would be as expected in any phone experience; except here, it will be hands-free.

With respect to an incoming call, the improved LED light/intercom system 10 can take on a very unique feature of operation. To prevent 'un-wanted' calls cascading through the system, only a caller equipped with an application (phone APP) that hand-shakes with the present invention unit-ID code 66 system, and having the 'special coded-pin' number can gain access. The logic here is, if a convention call is desired one would use a convention means to telephone, i.e., any phone. But, the use here is to facilitate a very private means between family members; those that only have the appropriate phone 'APP' application and special coded-pin. A particularly useful purpose of the present invention with this functionality is if a family member (with special needs) is disabled or elderly or sick and cannot get around easily. A concerned family member could 'call-in' to the light-intercom system 10 network to check on their loved one, and the 'special coded-pin' would allow a request (with a 'bing' to occur), as if that family member were just in the other room of the home using the intercom. In this scenario, the special needs individual would simply talk back; establishing a communication connection at whatever location they may be in the network, all hands-free as described in FIG. 19.

A further nuance of such a function, with additional permission in the special coded-pin and setup in the phone APP, could allow the caller to automatically answer and access the light/intercom system 10. In this scenario, if someone was very sick, for example, and cannot manage to do the 'answer' sequence of commands (as detailed in FIG. 19). The caller can initiate an automatic answer, and, directly inquire verbally to their loved one, how they are doing. The loved one, in this case, would simple response in their voice how they are feeling. Imagine, a busy working son or daughter calling-in several times a day, to a sick parent. The light/intercom system 10 at the parent's location would customarily do the 'ding' tone to alert that the intercom is active. Followed by the loved one's voice saying "mom, how are you feeling . . . ?", or dad do you need anything . . . ?" Great comfort is afforded to both the concerned family member and the loved one in need. The inquiry could come from any location; across the building structure, across the city, or state, or country, or indeed even the world; as if they are right there present with the loved one. This is a unique feature not available in any other format, or by any other device or means.

In operation, the present invention for an improved LED lighting/intercom system 10 incorporating both lighting (for illumination) and intercom (for communications) means, into a bulb envelope housing H-A, H-B, H-C, H-D or H-E, while maintaining substantially the standard style and shape or form of the conventional light bulb housing. The housing, of any style/type/shape of conventional light bulbs, lighting fixtures or lamps; making the improved LED light/intercom system 10 disclosed herein, easily a direct replacement for any prior art devices preexisting. Said lighting and intercom means executed with verbal command to control for all aspect of functionality.

In the manufacturing of the improved 'two-part assembly' LED light/intercom system 10, the rechargeable battery 20 can be shipped separately, or, shipped in a dormant state (fully assembled) until the end user would cause a 'one-time' activating means by removing a pull-tape to initialize the electronics at a desired time (making connection between the battery 20 contacts 96 and the PCB (+) and (−) contacts 98 & 100, as disclosed in FIG. 4). When first activated, the unit would flash the white LED array 24 once (via the start initialization process 220 in FIG. 12) and wait for a verbal command to identify the unit as a ceiling, floor, table or wall light object, and, when successful in the identifying process, flash the white LED array 24 twice, indicating the command is understood. The light/intercom system 10 would also allow an opportunity to set the unit's volume setting (as described in 'test' unit 274 of FIG. 13).

If the battery does experience a drop in stored energy, a low battery is sensed it would enter a low battery state. Appropriate notification via a pulse to the speaker 32 would 'chirp'. That is, emit a very short duration pulse of sound, for example once per minute. To correct this low battery situation, the user would simply 'turn-ON' the lighting/intercom system 10 by making the VAC line power present to the system and recharge the battery 20. This would sufficiently re-charge the battery and chirping would immediately stop.

The present invention for an improved LED light/intercom system 10, can communicate 36 via short range radio frequency (RF) signaling, and be received by any system device within range, and re-transmitted as a repeat signal. In an intercom scenario of how a home network, with the present invention of an improved light/intercom system 10, is installed in every room may unfold: A user occupant in the garage (at one end of the house), may verbal command "INTERCOM—ACTIVE" and a 'bing' tone would be apparent at all locations of the light/intercom system 10 (via the RF transition and repeat transition) throughout the network; followed by any speech message. In this scenario, let us assume the mother just return home with groceries and wants her son Johnny to help, the message could be "JOHNNY, I NEED YOU." The mother no knowing where Johnny is in the home so the message was broadcasted universally to all locations (by not giving the directive, i.e., last phrase in the command. If the command was "INTERCOM-ACTIVE-JOHNNY", the link would have been directly between the garage and Johnny's room (ROOM-1 and ROOM-7 as indicated in FIG. 9). Since Johnny was in the living room at the time of the request (Room-4 of FIG. 9), he would simply respond at that location . . . "YES MOTHER?" and the two locations (garage & living room) are immediately linked in a private conversation, that is not broadcasted to all other locations; whereupon Johnny's mother would complete the request for her son to come to the garage and help with the groceries.

At the end of the conversation, either one of them could terminate the link of the two, light/intercom system 10 units by commanding "INTERCOM END", or simple by the silence, the system would terminate on its own after a 'timeout' as indicated in FIG. 15; a 'bong' tone would sound that indicated the intercom is no longer active.

The command and control process of the improved LED light/intercom system 10 is very easy to understand and use. From just out-of-the-box and the two parts 'snapped' together, the unit would flash the white LED array and the use would say the intended objective, i.e., "TABLE LIGHT." Then install the system into the lamp fixture of the desired table. The user would there forward simply command "TABLE-LIGHT-ON", in the listing range of the unit, and the system would follow the command. If the light was too bright, another command . . . "TABLE-LIGHT-DIM" and the unit would dim down to 80% of full capacity, etc. The other commands and controls are just as simple to understand, follow and execute.

One other feature is important to understand. Since the lamp fixture on/off switch is normally left in the ON position (and always having 120/230 VAC Line voltage available to the light/intercom system 10), one could position the lamp fixture on/off switch 'off'; then followed immediately back to 'on.' This would cause the lamp fixture to simply turn ON; with no voice command or any other action. Such a feature is particularly useful to a guest in the owner's home that may not be familiar with the system lighting commands. The guest would simply operate the switch as normal, and when there is no action (since the switch was now in the off position), it is presumed that the guest would position the switch back to its original position, and thus, turn the light on. In any case, informing a guest to do such an instruction is simple to accomplish and remember; over having them to remember lighting commands.

The lamp fixture would stay in this 'on' state until the next scheduled event (AUTO, TIMER) and voice command (OFF, DIM, NIGHT, EMERGENCY or PRESET) was ordered. In other words, the light fixture would act, fairly close to a conventional light; with respect to turning 'on' the fixture. It is important to understand, in this scenario of a guest entering a room, of a home that was equipped with the light/intercom system 10, of the present invention, and, not being familiar with the command process, e.g., the light would come 'on' by functioning the mechanical fixture switch as found conventionally in any home.

Finally, although the light/intercom system 10 can function fully on its own, it is well complimented to work in conjunction with the base-station BS control-center. Programing can be initiated via simple to execute menu driven applications augmented with sound and voice commands. With respect to any given language (English, Spanish, French, etc.) both the light/intercom system 10 and the base station can have its limited vocabulary library stored in memory, and then selected on board, or, different models with different languages programed into it for different marketing countries. The base-station BS can also 'download' a different language library to the light/intercom system 10 via the T/R communications means.

The inventers want to make clear, that by 'programing' of the vocabulary, comprising the speech voice recognition library in each light/intercom system 10, can be a learning process. For example, someone who has a speech impediment, accent or any kind of non-normal speech that would make the voice command difficult to ascertain by the system, said speech unique to the system's owner can be achieved by venture of a learning process. The voice command can be a standard 'canned' representation, or, a uniquely 'learned' (representation of the commands) by the system. That is, the base-station BS can 'prompt' the owner (via a menu driven routine) to pronounce each voice command, and, record to memory its particular 'learned' articulation. The base-station BS then can forward via the T/R communications, to each light/intercom system 10 in the network. The result is that each network light/intercom system 10 now can fully understand 'so-called' standard voice command (that was part of the manufacturing process), and, the learned unique speech inflection of the same commands.

The disclosed light/intercom system 10 illustrates a preferred operating routine. For this 'two-part assembly' embodiment containing voice recognition commands and controls, and, have disclosed that the two-part assembly is mechanically constructed as an improved light bulb with an intercom built-in; fully controllable via hands-free voice commands.

It is explicitly understood that these routines and mechanical structures are for illustration of the benefits of the light/intercom system 10 and base-station control-center system, and that other means of operating routines and mechanical arrangements can be implemented (even though not listed) by those skilled in the art, without straying from the teaching the inventers have set forth. Therefore, it is understood that any other commands, or mechanical structures can be adopted and applied, and still be will considered under the philosophy and teaching of the present patent disclosed.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. An apparatus, comprising:
   a two part housing;
   wherein a first part comprises are LED, a speaker, and a processor;
   wherein a second part comprises a voice recognition, a microphone, a battery, a power circuit and a line power connector;
   wherein the first part and the second part have a coupling comprising a male element and female element for connecting the first part to the second part and creating an electrical union;
   an initialization program triggered by connecting the first part to the second part, wherein the initialization program generates an object command to which a one word response will define a unit identity;
   a hands-free set up program triggered by the initialization program;
   at least one lighting fixture defined by a conventional bulb housing, the at least one lighting fixture illuminating a light, the light controlled with at least one of the following commands:
   ON, OFF, DIM, BRIGHT, PRESET, NIGHT and EMERGENCY;
   a transmitter for transmitting radio frequency communications;
   a receiver for receiving radio frequency communications;
   a rechargeable battery operational with, the at least one lighting fixture;
   an audible portion indicating a status of the rechargeable battery;
   a network identification establishing a type, style, and location of the at least one lighting fixture;

a coding system operational with a base station, the coding system establishing identification of a device manufacturing iteration, a house code, a unit number and location designator, and an intercom category;

the coding system enabling connectivity with a cellular connection, a land-line connection, a computer, a LAN, and a Wi-Fi for out-of-network communications;

a voice activated command and control operational with speech, wherein said voice activated command is a standard command or a learned command;

a communication defined by a unique identification depicting the multiple apparatuses;

a voice speech recognition comprising a trigger part, an object part, and a directive part, whereby the trigger part comprises an INTERCOM command, whereby the object part comprises an ACTIVE command, an ON command, an END command, and a CANCEL command, whereby the directive part comprises an ALL command, RECORD command, PLAY command, PHONE command, ANSWER command, and a CALL command;

a lighting voice command that can be spoken in any order, the lighting voice command including at least one of the following:

a CEILING command operational with the at least one light fixture disposed on a ceiling, a FLOOR command operational with the at least one light fixture disposed on a floor, a TABLE command operational with the at least one light fixture disposed on a table, a WALL command operational with the at least one light fixture disposed on a wall, a directive command being an instruction to command a function of at least one of the following: ON, OFF, DIM, BRIGHT, NIGHT, PRESET, and EMERGENCY, a mode of operation command responding to at least one of the following voice commands: AUTO, TIMER, RESET NONE, RESET NULL, and TEST, a CHANGE-AUTO command enabling the apparatus to power on and off lighting when detecting motion, a CHANGE-TIMER command enabling the apparatus to power on and off in a timed interval, the timed interval automatically scaling to increase and decrease length of interval, a CHANGE-RESET command enabling the apparatus to return to a no-mode or null state, a CHANGE-TEST command enabling the apparatus to set a speaker volume to INCREASE or DECREASE;

the base station in communication with the at least one lighting fixture, the base station displaying a status of multiple apparatuses through a code identification; and an intercom to communicate between rooms, to record a message, to play-back the message, to connect to a phone means for out-going calling, and to connect to a phone means for answer an incoming call, and wherein the intercom further functions as an emergency assistant.

2. The apparatus of claim 1, wherein the transmitter and the receiver are operational with Bluetooth protocol and ZigBee protocol.

3. The apparatus of claim 1, wherein the at least one light fixture includes at least one of the following: an Edison style blub light, a track light, a recessed light, a projector or flood light, and a nightlight.

4. The apparatus of claim 1, wherein the directive command OFF is operational to operate the light of the at least one lighting fixture at a 0 percent of lighting capacity.

5. The apparatus of claim 4, wherein the directive command NIGHT and the directive command PRESET is operational to operate the light of the at least one lighting fixture between 0 and 100 percent of lighting capacity.

6. The apparatus of claim 5, wherein the directive command EMERGENCY is operational to change the apparatus to one of two emergency lighting states.

7. The apparatus of claim 6, wherein the one of two emergency lighting states comprises: flash full ON and OFF for a panic alert state when 120/230 VAC line power is available, and an illumination of 20 percent through battery power, for emergency lighting state when 120/230 VAC line power is not available.

8. The apparatus of claim 1, wherein the base station communicates with the multiple apparatuses, so as to identify each apparatus and a state of quiescence, or lighting state, or intercom active state, or battery level.

9. The apparatus of claim 1, wherein the apparatus responds with an activated tone and a deactivated tone to alert when ready to receive commands or returning to a quiescent state.

10. The apparatus of claim 9, wherein the activated tone is a bing sound.

11. The apparatus of claim 10, wherein the deactivated tone is a bong sound.

12. The apparatus of claim 1, wherein the intercom comprises a hands-free command.

13. The apparatus of claim 12, wherein the hands-free command of the intercom is INTERCOM ACTIVE.

14. The apparatus of claim 1, wherein the apparatus comprises a panic mode to flash lights ON and OFF.

15. The apparatus of claim 1, wherein the emergency lighting at 20 percent of lighting capacity powered by the battery.

16. The apparatus of claim 1, wherein the apparatus self-answers incoming phone calls through a software application and a special identification coded-pin.

17. An apparatus, comprising:
a two part housing;
wherein a first part comprises an LED, a speaker, and a processor;
wherein a second part comprises a voice recognition, a microphone, a battery, a power circuit and a line power connector;
wherein the first part and the second part have a coupling comprising a male element and female element for connecting the first part to the second part and creating an electrical union;
an initialization program triggered by connecting the first part to the second part, wherein the initialization program generates an object command to which a one word response will define a unit identity:
a hands-free set up program triggered by the initialization program;
at least one lighting fixture defined by a conventional bulb housing, the at least one lighting fixture illuminating a light, the light controlled with at least one of the following commands: ON, OFF, DIM, BRIGHT, PRESET, NIGHT and EMERGENCY;
a transmitter for transmitting radio frequency communications;
a receiver for receiving radio frequency communications;
a rechargeable battery operational with the at least one lighting fixture;

an audible portion indicating a status of the rechargeable battery;
a network identification establishing a type, style, and location of the at least one lighting fixture;
a coding system operational with a base station, the coding system establishing identification of a device manufacturing iteration, a house code, a unit number and location designator, and an intercom category;
the coding system enabling connectivity with a cellular connection, a land-line connection, a computer, a LAN, and a Wi-Fi for out-of-network communications;
a voice activated command and control operational with speech,
wherein said voice command is a standard 'canned' representation, or, a uniquely 'learned' representation of the commands by the system;
a communication defined by a unique identification depicting the multiple apparatuses;
a voice speech recognition comprising a trigger part, an object part, and a directive part,
whereby the trigger part comprises an INTERCOM command,
whereby the object part comprises an ACTIVE command, an ON command, an END command, and a CANCEL command,
whereby the directive part comprises an ALL command, RECORD command, PLAY command, PHONE command, ANSWER command, and a CALL command;
a lighting voice command that can be spoken in any order, the lighting voice command including at least one of the following:
a CEILING command operational with, the at least one light fixture disposed on a ceiling,
a FLOOR command operational with the at least one light fixture disposed on a floor,
a TABLE command operational with the at least one light fixture disposed on a table,
a WALL command operational with the at least one light fixture disposed on a wall,
a directive command being an instruction to command a function of at least one of the following: ON, OFF, DIM, BRIGHT, NIGHT, PRESET, and EMERGENCY,
a mode of operation command responding to at least one of the following voice commands: AUTO, TIMER, RESET NONE, RESET NULL, and TEST,
a CHANGE-AUTO command enabling the apparatus to power on and off lighting when detecting motion,
a CHANGE-TIMER command enabling the apparatus to power on and off in a timed interval, the timed interval automatically scaling to increase and decrease length of interval,
a CHANGE-RESET command enabling the apparatus to return to a no-mode or null state,
a CHANGE-TEST command enabling the apparatus to set speaker volume to INCREASE or DECREASE;
the base station in communication with the at least one lighting fixture, the base station displaying a status of multiple apparatuses through a code identification, the base station communicating with the apparatus, so as to identify a state of quiescence, or lighting state, or intercom active state, or battery level; and
an intercom to communicate between rooms, to record a message, to play-back the message, to connect to a phone means for out-going calling, and to connect to a phone means for answer an incoming call,
wherein the intercom comprises a hands-free command,
wherein the hands-free command of the intercom is INTERCOM ACTIVE,
wherein the intercom further functions as an emergency assistant.

18. An apparatus, comprising:
a two part housing having a first part and a second part;
wherein the first part and the second part have a coupling comprising a male element and female element for connecting the first part to the second part and creating an electrical union;
an initialization program triggered by connecting the first part to the second part, wherein the initialization program generates an object command to which a one word response will define a unit identity;
a hands-free set up program triggered by the initialization program;
a transmitter for transmitting radio frequency communications;
a receiver for receiving radio frequency communications;
a microphone for listening;
a speaker for broadcasting;
a coding system enabling connectivity with a cellular connection, a land-line connection, a computer, a LAN, and a Wi-Fi for out-of-network communications;
a voice activated command and control operational with speech,
a voice speech recognition comprising a trigger part, an object part, and a directive part,
whereby the trigger part comprises an INTERCOM command,
whereby the object part comprises an ACTIVE command, an ON command, an END command, and a CANCEL command,
whereby the directive part comprises an ALL command, RECORD command, PLAY command, PHONE command, ANSWER command, and a CAII, command;
a lighting voice command that can be spoken in any order, the lighting voice command including at least one of the following:
a CEILING command operational with the at least one light fixture disposed on a ceiling,
a FLOOR command operational with the at least one light fixture disposed on a floor,
a TABLE command operational with the at least one light fixture disposed on a table,
a WALL command operational with the at least one light fixture disposed on a wall,
a directive command being an instruction to command a function of at least one of the following: ON, OFF, DIM, BRIGHT, NIGHT, PRESET, and EMERGENCY,
a mode of operation command responding to at least one of the following voice commands: AUTO, TIMER, RESET NONE, RESET NULL, and TEST,
an intercom to communicate between rooms,
wherein the intercom comprises a hands-free command.

19. The apparatus of claim 18, wherein the first part includes the speaker and the second part includes the microphone.

20. The apparatus of claim 19, wherein the first part includes an LED and a processor;
and wherein the second part includes a voice recognition, a battery, a power circuit and a threaded bulb connector.

* * * * *